(12) United States Patent
Reisner-Stehman et al.

(10) Patent No.: US 11,612,865 B1
(45) Date of Patent: Mar. 28, 2023

(54) AGITATOR FOR A CARBONATION SYSTEM

(71) Applicant: SharkNinja Operating LLC, Needham, MA (US)

(72) Inventors: Noa Reisner-Stehman, Cambridge, MA (US); Tiehe Yang, Shenzhen (CN); Tao Yi, Shenzhen (CN); Zihuang Lin, Shenzhen (CN); Miles William Noel Hember, Cambridge (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/843,078

(22) Filed: Jun. 17, 2022

Related U.S. Application Data

(63) Continuation of application No. PCT/CN2022/092688, filed on May 13, 2022.

(51) Int. Cl.
*B01F 23/233* (2022.01)
*B01F 27/1111* (2022.01)
(Continued)

(52) U.S. Cl.
CPC .............. *B01F 27/1111* (2022.01); *A23L 2/54* (2013.01); *B01F 23/233* (2022.01);
(Continued)

(58) Field of Classification Search
CPC .................... B01F 23/23311; B01F 27/1111
(Continued)

(56) References Cited

U.S. PATENT DOCUMENTS 1,123,092 A * 12/1914 Calvert ..................... F28C 1/00
261/24
1,242,493 A 10/1917 Stringham
(Continued)

FOREIGN PATENT DOCUMENTS

AU 2014241782 B2 9/2017
CA 2903862 A1 9/2014
(Continued)

OTHER PUBLICATIONS

Chemineer, Inc. (2013) "BT-6 Gas Dispersion Impeller".
(Continued)

*Primary Examiner* — David L Sorkin
(74) *Attorney, Agent, or Firm* — Mintz Levin Cohn Ferris Glovsky and Popeo, P.C.

(57) ABSTRACT

Various exemplary agitators for a carbonation system, systems including an agitator for a carbonation system, and methods including an agitator for a carbonation system are provided. In general, an agitator is configured to rotate in a chamber to mix together a gas, such as carbon dioxide, and a liquid, such as water, to form a carbonated fluid. The agitator includes a plurality of paddles configured to encourage the mixing of the gas and the fluid by agitating the gas and the liquid during the agitator's rotation. Each of the arms has an angled outer tip to facilitate the efficient mixing. The agitator includes a hollow shaft through which the gas is configured to flow during the agitator's rotation. The agitator can be part of a carbonation system configured to dispense the carbonated fluid as a beverage.

22 Claims, 17 Drawing Sheets

(51) Int. Cl.
  *A23L 2/54* (2006.01)
  *B01F 23/237* (2022.01)
  *B01F 35/32* (2022.01)
  *B67D 1/00* (2006.01)
  *B01F 101/14* (2022.01)

(52) U.S. Cl.
  CPC .. *B01F 23/237621* (2022.01); *B01F 35/3204* (2022.01); *B01F 2101/14* (2022.01); *B67D 1/007* (2013.01)

(58) Field of Classification Search
  USPC ...... 261/84, 85, 87; 366/265, 273, 274, 317, 366/325.92
  See application file for complete search history.

(56) References Cited

U.S. PATENT DOCUMENTS

| | | | |
|---|---|---|---|
| 1,420,773 A | | 6/1922 | Stainbrook |
| 2,350,534 A | * | 6/1944 | Rosinger ............. A47J 43/0465 310/104 |
| 2,566,743 A | * | 9/1951 | Okulitch ............... H02K 49/108 310/104 |
| 2,917,372 A | * | 12/1959 | Wallin ................. B01F 23/2331 422/231 |
| 3,108,146 A | * | 10/1963 | Gross .................. B01F 23/2331 96/353 |
| 3,479,017 A | * | 11/1969 | Thikotter .................. C02F 3/16 210/219 |
| 4,251,473 A | | 2/1981 | Gilbey |
| 4,518,541 A | | 5/1985 | Harris |
| 4,752,138 A | | 6/1988 | Rufer |
| 4,866,324 A | | 9/1989 | Yuzawa et al. |
| 5,038,976 A | | 8/1991 | Mcmillin |
| 5,128,574 A | | 7/1992 | Koizumi et al. |
| 5,156,871 A | | 10/1992 | Goulet et al. |
| 5,399,014 A | * | 3/1995 | Takata ................. B01J 19/0066 366/325.92 |
| 5,407,271 A | * | 4/1995 | Jorgensen ........... B01F 27/1161 366/265 |
| 6,095,677 A | | 8/2000 | Karkos et al. |
| 6,336,603 B1 | | 1/2002 | Karkos et al. |
| 6,672,481 B2 | | 1/2004 | Ziesel |
| 6,712,497 B2 | | 3/2004 | Jersey et al. |
| 7,097,074 B2 | | 8/2006 | Halliday et al. |
| 7,114,707 B2 | | 10/2006 | Rona et al. |
| 7,213,506 B2 | | 5/2007 | Halliday et al. |
| 7,219,598 B2 | | 5/2007 | Halliday et al. |
| 7,231,869 B2 | | 6/2007 | Halliday et al. |
| 7,255,039 B2 | | 8/2007 | Halliday et al. |
| 7,287,461 B2 | | 10/2007 | Halliday et al. |
| 7,288,276 B2 | | 10/2007 | Rona et al. |
| 7,316,178 B2 | | 1/2008 | Halliday et al. |
| 7,322,277 B2 | | 1/2008 | Halliday et al. |
| 7,418,899 B2 | | 9/2008 | Halliday et al. |
| 7,445,133 B2 | | 11/2008 | Ludovissie et al. |
| 7,533,603 B2 | | 5/2009 | Halliday et al. |
| 7,533,604 B2 | | 5/2009 | Halliday et al. |
| 7,592,027 B2 | | 9/2009 | Halliday et al. |
| 7,607,385 B2 | | 10/2009 | Halliday et al. |
| 7,625,532 B2 | * | 12/2009 | Bridgwater ................ B01J 8/10 422/204 |
| 7,669,737 B2 | | 3/2010 | Bethuy et al. |
| 7,681,492 B2 | | 3/2010 | Suggi et al. |
| 7,703,381 B2 | | 4/2010 | Liverani et al. |
| 7,731,161 B2 | | 6/2010 | Seiwert et al. |
| 7,806,294 B2 | | 10/2010 | Gatipon et al. |
| 7,975,988 B2 | | 7/2011 | Thomson et al. |
| 8,087,347 B2 | | 1/2012 | Halliday et al. |
| 8,113,384 B2 | | 2/2012 | Bethuy et al. |
| 8,172,453 B2 | | 5/2012 | Boussemart et al. |
| 8,282,268 B2 | | 10/2012 | Karkos et al. |
| 8,403,179 B1 | | 3/2013 | Gerber |
| 8,555,774 B2 | | 10/2013 | Patera et al. |
| 8,590,746 B2 | | 11/2013 | Bethuy et al. |
| 8,616,412 B2 | | 12/2013 | Bethuy et al. |
| 8,621,990 B2 | | 1/2014 | Fang et al. |
| 8,661,966 B2 | | 3/2014 | Stearns et al. |
| 8,668,376 B2 | | 3/2014 | Krauchi et al. |
| 8,677,888 B2 | | 3/2014 | Santoiemmo |
| 8,685,477 B2 | | 4/2014 | Almblad et al. |
| 8,746,506 B2 | | 6/2014 | Jersey et al. |
| 8,757,227 B2 | | 6/2014 | Girard et al. |
| 8,770,094 B2 | | 7/2014 | Rithener et al. |
| 8,794,126 B2 | | 8/2014 | Skalski et al. |
| 8,807,824 B2 | | 8/2014 | Bodum |
| 8,826,688 B2 | | 9/2014 | Tachibana et al. |
| 8,833,241 B2 | | 9/2014 | Santoiemmo |
| 8,840,092 B2 | | 9/2014 | Kumar et al. |
| 8,844,555 B2 | | 9/2014 | Schneider |
| 8,960,500 B2 | | 2/2015 | Van Opstal et al. |
| 8,985,395 B2 | | 3/2015 | Tansey |
| 8,985,396 B2 | | 3/2015 | Jersey et al. |
| 8,985,561 B2 | | 3/2015 | Hatherell |
| 9,026,245 B2 | | 5/2015 | Tilton et al. |
| 9,044,718 B2 | | 6/2015 | Ludwig et al. |
| 9,045,722 B2 | | 6/2015 | Reif et al. |
| 9,051,162 B2 | | 6/2015 | Peters et al. |
| 9,056,287 B2 | | 6/2015 | Peltola et al. |
| 9,060,650 B2 | | 6/2015 | De |
| 9,107,448 B2 | | 8/2015 | Giardino et al. |
| 9,107,449 B2 | | 8/2015 | Njaastad et al. |
| 9,107,533 B2 | | 8/2015 | Volz et al. |
| 9,114,368 B2 | | 8/2015 | Njaastad et al. |
| 9,155,330 B1 | | 10/2015 | Shtivelman |
| 9,161,654 B2 | | 10/2015 | Belmont |
| 9,166,448 B2 | | 10/2015 | Lam et al. |
| 9,167,935 B2 | | 10/2015 | Scholvinck et al. |
| 9,233,824 B2 | | 1/2016 | Alan et al. |
| 9,290,317 B2 | | 3/2016 | Quinn et al. |
| 9,295,278 B2 | | 3/2016 | Nowak |
| 9,364,018 B1 | | 6/2016 | Peterson et al. |
| 9,371,176 B2 | | 6/2016 | Kohli et al. |
| 9,375,686 B2 | | 6/2016 | Boarman et al. |
| 9,409,759 B2 | | 8/2016 | Wilder et al. |
| 9,440,836 B2 | | 9/2016 | Quittner et al. |
| 9,481,508 B2 | | 11/2016 | Oh |
| 9,486,102 B2 | | 11/2016 | Baldo |
| 9,493,298 B2 | | 11/2016 | Evans et al. |
| 9,505,510 B2 | | 11/2016 | Hatherell |
| 9,521,924 B2 | | 12/2016 | Priley et al. |
| 9,527,047 B2 | | 12/2016 | Ring et al. |
| D779,046 S | | 2/2017 | Tansey, Jr. |
| 9,630,157 B2 | | 4/2017 | Li et al. |
| 9,651,188 B2 | | 5/2017 | Green et al. |
| 9,664,264 B2 | | 5/2017 | Kristlbauer |
| 9,687,796 B2 | | 6/2017 | Hoare et al. |
| 9,701,527 B2 | | 7/2017 | Tansey, Jr. |
| 9,708,109 B2 | | 7/2017 | Marina et al. |
| 9,718,035 B2 | | 8/2017 | Bandixen et al. |
| 9,723,863 B2 | | 8/2017 | Njaastad et al. |
| 9,751,054 B2 | | 9/2017 | Jin et al. |
| 9,754,437 B2 | | 9/2017 | Deo et al. |
| 9,783,403 B2 | | 10/2017 | Tansey, Jr. |
| 9,783,405 B2 | | 10/2017 | Olson et al. |
| 9,790,076 B2 | | 10/2017 | Novak et al. |
| 9,801,500 B2 | | 10/2017 | Ven Der Woning |
| 9,809,437 B2 | | 11/2017 | Tansey, Jr. |
| 9,821,951 B2 | | 11/2017 | Estabrook et al. |
| 9,854,935 B2 | | 1/2018 | Danieli et al. |
| 9,897,220 B2 | | 2/2018 | Cohen et al. |
| 10,000,370 B2 | | 6/2018 | Bethuy et al. |
| 10,017,372 B2 | | 7/2018 | Bethuy et al. |
| 10,028,614 B2 | | 7/2018 | Perentes et al. |
| 10,046,903 B2 | | 8/2018 | Evans et al. |
| 10,046,904 B2 | | 8/2018 | Evans et al. |
| 10,051,988 B2 | | 8/2018 | Gordon et al. |
| 10,058,826 B2 | | 8/2018 | Cohen et al. |
| 10,070,751 B2 | | 9/2018 | Magniet et al. |
| 10,099,443 B1 | | 10/2018 | Evans et al. |
| 10,131,529 B2 | | 11/2018 | Jersey et al. |
| 10,143,978 B2 | | 12/2018 | Tipton |
| 10,155,647 B2 | | 12/2018 | Foster et al. |

(56) References Cited

U.S. PATENT DOCUMENTS

| | | |
|---|---|---|
| 10,159,376 B2 | 12/2018 | Dovat et al. |
| 10,165,892 B2 | 1/2019 | Lafosse |
| 10,193,411 B2 | 1/2019 | Tajima et al. |
| 10,201,171 B2 | 2/2019 | Gordon et al. |
| 10,201,785 B2 | 2/2019 | Cohen et al. |
| 10,206,533 B2 | 2/2019 | Pirone |
| 10,213,752 B2 | 2/2019 | Shalev |
| 10,227,226 B2 | 3/2019 | Jersey et al. |
| 10,307,718 B2 | 6/2019 | Waisman |
| 10,329,134 B2 | 6/2019 | Olson et al. |
| 10,334,871 B2 | 7/2019 | Van De Sluis et al. |
| 10,336,597 B2 | 7/2019 | Griscik et al. |
| 10,343,885 B2 | 7/2019 | Novak et al. |
| 10,349,773 B2 | 7/2019 | Segiet et al. |
| 10,350,561 B1 | 7/2019 | Dushine et al. |
| 10,370,235 B2 | 8/2019 | Pellaud |
| 10,377,620 B2 | 8/2019 | Makino et al. |
| 10,399,838 B2 | 9/2019 | Green |
| 10,399,839 B2 | 9/2019 | Knoll et al. |
| 10,405,690 B2 | 9/2019 | Tentorio |
| 10,433,668 B2 | 10/2019 | Merali et al. |
| 10,455,973 B2 | 10/2019 | Dollner et al. |
| 10,456,757 B1 | 10/2019 | Blichmann |
| 10,470,605 B2 | 11/2019 | Ergican et al. |
| 10,485,374 B2 | 11/2019 | Lo Faro et al. |
| 10,506,896 B2 | 12/2019 | Ven Der Woning |
| 10,513,424 B2 | 12/2019 | Tansey, Jr. |
| 10,518,938 B2 | 12/2019 | Suzuki et al. |
| 10,519,020 B2 | 12/2019 | Ozawa et al. |
| 10,524,617 B2 | 1/2020 | Perrin et al. |
| 10,526,186 B2 | 1/2020 | Kuboi et al. |
| 10,543,977 B2 | 1/2020 | Brockman et al. |
| 10,568,452 B2 | 2/2020 | Fin et al. |
| 10,595,549 B2 | 3/2020 | Van De Sluis et al. |
| 10,631,686 B2 | 4/2020 | Abdo et al. |
| 10,647,564 B2 | 5/2020 | Showalter |
| 10,654,700 B2 | 5/2020 | Hecht |
| 10,674,857 B2 | 6/2020 | Lyons et al. |
| 10,674,863 B2 | 6/2020 | Sevcik et al. |
| 10,676,336 B2 | 6/2020 | Makino et al. |
| 10,682,007 B2 | 6/2020 | Fischer |
| 10,702,835 B2 | 7/2020 | Tran et al. |
| 10,702,838 B2 | 7/2020 | Chaussin et al. |
| 10,707,734 B2 | 7/2020 | Holenstein et al. |
| 10,765,254 B2 | 9/2020 | Iotti et al. |
| 10,780,408 B2 | 9/2020 | Schöb et al. |
| 10,791,752 B2 | 10/2020 | Siegel et al. |
| 10,793,346 B2 | 10/2020 | Bartoli et al. |
| 10,807,049 B2 | 10/2020 | Abdo et al. |
| 10,807,853 B2 | 10/2020 | Balstad et al. |
| 10,813,501 B2 | 10/2020 | Helf et al. |
| 10,829,359 B2 | 11/2020 | Von Kraus et al. |
| 10,842,313 B2 | 11/2020 | Novak et al. |
| 10,843,142 B2 | 11/2020 | Waggoner et al. |
| 10,843,866 B2 | 11/2020 | Cafaro et al. |
| 10,846,975 B2 | 11/2020 | Tansey et al. |
| 10,849,451 B2 | 12/2020 | Su |
| 10,849,454 B2 | 12/2020 | Gordon et al. |
| 10,869,572 B2 | 12/2020 | Blatt |
| 10,870,566 B2 | 12/2020 | Green et al. |
| 10,882,728 B2 | 1/2021 | Hong et al. |
| 10,883,072 B2 | 1/2021 | Hong et al. |
| 10,893,773 B2 | 1/2021 | Standaar et al. |
| 10,905,287 B2 | 2/2021 | Tu et al. |
| 10,906,013 B2 | 2/2021 | Cohen et al. |
| 10,919,752 B2 | 2/2021 | Breault |
| 10,945,554 B2 | 3/2021 | Lo Faro et al. |
| 10,945,557 B2 | 3/2021 | Nishimura et al. |
| 10,947,485 B2 | 3/2021 | Min et al. |
| 10,952,562 B2 | 3/2021 | Tanner et al. |
| 10,966,564 B2 | 4/2021 | Rijskamp et al. |
| 11,021,359 B2 | 6/2021 | Bissen et al. |
| 11,064,715 B2 | 7/2021 | Herbert et al. |
| 11,084,007 B2 | 8/2021 | Adams |
| 11,084,701 B2 | 8/2021 | Kuboi et al. |
| 11,097,236 B2 | 8/2021 | Alexander et al. |
| 11,110,418 B2 | 9/2021 | Furman et al. |
| 11,124,404 B2 | 9/2021 | Von Kraus et al. |
| 11,129,490 B2 | 9/2021 | Park et al. |
| 11,129,491 B2 | 9/2021 | Park et al. |
| 11,148,927 B2 | 10/2021 | Wing et al. |
| 11,166,593 B2 | 11/2021 | Trakselis |
| 11,167,231 B2 | 11/2021 | Akdim et al. |
| 11,194,443 B2 | 12/2021 | Deo et al. |
| 11,206,941 B2 | 12/2021 | Abdo et al. |
| 11,208,310 B2 | 12/2021 | Tansey et al. |
| 11,246,326 B2 | 2/2022 | Feola |
| 11,247,186 B2 | 2/2022 | Topp-manske |
| 11,250,659 B2 | 2/2022 | Tansey et al. |
| 11,252,976 B2 | 2/2022 | Popov et al. |
| 11,254,491 B2 | 2/2022 | Krüger |
| 11,254,586 B1 | 2/2022 | Santoiemmo |
| 11,274,027 B2 | 3/2022 | Krüger et al. |
| 11,284,736 B2 | 3/2022 | Ochoa et al. |
| 11,312,604 B2 | 4/2022 | Mehta et al. |
| 2003/0007417 A1* | 1/2003 | Miyata .................. B01J 19/006 366/325.92 |
| 2003/0012849 A1 | 1/2003 | Berson |
| 2014/0154368 A1 | 6/2014 | Kells et al. |
| 2014/0175125 A1 | 6/2014 | Breault |
| 2015/0125586 A1 | 5/2015 | Ergican |
| 2015/0374025 A1 | 12/2015 | Evans et al. |
| 2016/0009539 A1 | 1/2016 | Jersey et al. |
| 2016/0192806 A1 | 7/2016 | Pikkemaat et al. |
| 2016/0242456 A1 | 8/2016 | Evans et al. |
| 2016/0251208 A1 | 9/2016 | Tansey, Jr. |
| 2016/0255991 A1 | 9/2016 | Givens et al. |
| 2016/0318689 A1 | 11/2016 | Rudick et al. |
| 2016/0332124 A1 | 11/2016 | Cohen |
| 2017/0215645 A1 | 8/2017 | Doglioni Majer et al. |
| 2017/0334636 A1 | 11/2017 | Park et al. |
| 2018/0057337 A1 | 3/2018 | Babucke et al. |
| 2018/0251358 A1 | 9/2018 | Wing et al. |
| 2018/0251361 A1 | 9/2018 | Wing et al. |
| 2019/0077586 A1 | 3/2019 | Cafaro et al. |
| 2019/0134583 A1 | 5/2019 | Lautenschläger et al. |
| 2019/0146641 A1 | 5/2019 | Deo et al. |
| 2019/0153368 A1 | 5/2019 | Yoon et al. |
| 2019/0169016 A1 | 6/2019 | Vandekerckhove et al. |
| 2019/0191916 A1 | 6/2019 | Guyon et al. |
| 2019/0269156 A1 | 9/2019 | Van De Sluis et al. |
| 2019/0270630 A1 | 9/2019 | Dahan et al. |
| 2019/0274469 A1 | 9/2019 | Van De Sluis |
| 2019/0274482 A1 | 9/2019 | Abdo et al. |
| 2019/0275478 A1 | 9/2019 | Jersey et al. |
| 2019/0291062 A1 | 9/2019 | Wood et al. |
| 2019/0291064 A1 | 9/2019 | Conroy et al. |
| 2019/0292034 A1 | 9/2019 | Wood et al. |
| 2019/0292036 A1 | 9/2019 | Rice et al. |
| 2019/0328170 A1 | 10/2019 | Cai |
| 2019/0335952 A1 | 11/2019 | Di Bari |
| 2019/0337713 A1 | 11/2019 | Ergican et al. |
| 2019/0367350 A1 | 12/2019 | Bhutani et al. |
| 2020/0010311 A1 | 1/2020 | Moore |
| 2020/0017806 A1 | 1/2020 | Peirsman et al. |
| 2020/0031651 A1 | 1/2020 | Schneidewend et al. |
| 2020/0047137 A1 | 2/2020 | Wilder et al. |
| 2020/0060465 A1 | 2/2020 | Longman et al. |
| 2020/0077841 A1 | 3/2020 | Dercar et al. |
| 2020/0079637 A1 | 3/2020 | Kaplita et al. |
| 2020/0107671 A1 | 4/2020 | Gordon et al. |
| 2020/0121115 A1 | 4/2020 | Oh |
| 2020/0122100 A1 | 4/2020 | Tumey |
| 2020/0122994 A1 | 4/2020 | Cimatti et al. |
| 2020/0146308 A1 | 5/2020 | Roberts et al. |
| 2020/0146500 A1 | 5/2020 | Cafaro et al. |
| 2020/0146501 A1 | 5/2020 | Mchugh et al. |
| 2020/0156019 A1 | 5/2020 | Sawyer et al. |
| 2020/0187718 A1 | 6/2020 | Seidl |
| 2020/0216786 A1 | 7/2020 | Pintz |
| 2020/0229472 A1 | 7/2020 | Manne |
| 2020/0253361 A1 | 8/2020 | Davidson |
| 2020/0331739 A1 | 10/2020 | Mehta et al. |
| 2020/0345170 A1 | 11/2020 | Jarisch et al. |

(56) References Cited

U.S. PATENT DOCUMENTS

| | | |
|---|---|---|
| 2020/0359822 A1 | 11/2020 | Dercar et al. |
| 2020/0359841 A1 | 11/2020 | Dercar et al. |
| 2020/0360875 A1 | 11/2020 | Danieli et al. |
| 2020/0361758 A1 | 11/2020 | Fantappié et al. |
| 2020/0369504 A1 | 11/2020 | Balstad et al. |
| 2020/0369505 A1 | 11/2020 | Mckay |
| 2020/0375221 A1 | 12/2020 | Colvin et al. |
| 2020/0397184 A1 | 12/2020 | Ruggiero et al. |
| 2021/0000289 A1 | 1/2021 | Krüger et al. |
| 2021/0013785 A1 | 1/2021 | Liang et al. |
| 2021/0015303 A1 | 1/2021 | Byun et al. |
| 2021/0106163 A1 | 4/2021 | Van De Sluis et al. |
| 2021/0127902 A1 | 5/2021 | Deng et al. |
| 2021/0137304 A1 | 5/2021 | Krger et al. |
| 2021/0137315 A1 | 5/2021 | Byun et al. |
| 2021/0171333 A1 | 6/2021 | Amos |
| 2021/0177189 A1 | 6/2021 | Kordich et al. |
| 2021/0179411 A1 | 6/2021 | Dahan et al. |
| 2021/0196074 A1 | 7/2021 | Guarin et al. |
| 2021/0259472 A1 | 8/2021 | Seidler et al. |
| 2021/0261324 A1 | 8/2021 | Arnold |
| 2021/0292152 A1 | 9/2021 | Fedorka et al. |
| 2021/0307564 A1 | 10/2021 | Gort-barten |
| 2021/0317393 A1 | 10/2021 | Peirsman et al. |
| 2021/0338004 A1 | 11/2021 | Alsayar et al. |
| 2021/0361112 A1 | 11/2021 | Hobden et al. |
| 2021/0362993 A1 | 11/2021 | Shafir et al. |
| 2021/0378267 A1 | 12/2021 | Barak |
| 2022/0002134 A1 | 1/2022 | Pellaud |
| 2022/0022496 A1 | 1/2022 | Monsanto et al. |
| 2022/0024748 A1 | 1/2022 | Fantappie et al. |
| 2022/0031113 A1 | 2/2022 | Smith et al. |
| 2022/0033172 A1 | 2/2022 | Favre |
| 2022/0039587 A1 | 2/2022 | De Freitas |
| 2022/0039602 A1 | 2/2022 | Xiong |
| 2022/0040651 A1 | 2/2022 | Böttcher et al. |
| 2022/0071441 A1 | 3/2022 | Patil et al. |

FOREIGN PATENT DOCUMENTS

| | | |
|---|---|---|
| CA | 2961901 A1 | 4/2016 |
| CN | 1016312 A | 4/1992 |
| CN | 201200323 Y | 3/2009 |
| CN | 203314745 U | 12/2013 |
| CN | 203576299 U | 5/2014 |
| CN | 103720363 B | 11/2015 |
| CN | 105595868 A | 5/2016 |
| CN | 103430117 B | 5/2017 |
| CN | 109171502 A | 1/2019 |
| CN | 109380973 A | 2/2019 |
| CN | 110247484 A | 9/2019 |
| CN | 105011305 B | 5/2020 |
| CN | 111466793 A | 7/2020 |
| CN | 111589315 A | 8/2020 |
| CN | 112421819 A | 2/2021 |
| CN | 112998522 A | 6/2021 |
| CN | 108768070 B | 9/2021 |
| CN | 109863112 B | 2/2022 |
| EP | 1351758 A1 | 10/2003 |
| EP | 1767262 B1 | 8/2008 |
| EP | 1718403 B1 | 5/2011 |
| EP | 2340754 B1 | 10/2012 |
| EP | 2737834 A1 | 6/2014 |
| EP | 2969899 A2 | 1/2016 |
| EP | 3003542 A4 | 1/2017 |
| EP | 2359260 B1 | 6/2017 |
| EP | 3261981 A1 | 1/2018 |
| EP | 3040114 B1 | 3/2019 |
| EP | 3533937 A3 | 11/2019 |
| EP | 2504271 B1 | 4/2020 |
| EP | 3760795 A1 | 1/2021 |
| EP | 3200610 B1 | 2/2021 |
| ES | 2351796 T3 | 2/2011 |
| GB | 2486872 B | 3/2016 |
| IL | 119044 | 11/1996 |
| RU | 2491875 C2 | 9/2013 |
| WO | 9807122 A1 | 2/1998 |
| WO | 0103817 A1 | 1/2001 |
| WO | 03098776 A1 | 11/2003 |
| WO | 2009135758 A1 | 11/2009 |
| WO | 2013019963 A3 | 5/2013 |
| WO | 2014201753 A1 | 12/2014 |
| WO | 2016202815 A1 | 12/2016 |
| WO | 2017109718 A1 | 6/2017 |
| WO | 2020148294 A1 | 7/2020 |
| WO | 2020148293 A3 | 9/2020 |
| WO | 2020174336 A1 | 9/2020 |
| WO | 2020193376 A1 | 10/2020 |
| WO | 2020219385 A1 | 10/2020 |
| WO | 2020234060 A1 | 11/2020 |
| WO | 2021016331 A1 | 1/2021 |
| WO | 2021016343 A1 | 1/2021 |
| WO | 2021018760 A1 | 2/2021 |
| WO | 2021032892 A1 | 2/2021 |
| WO | 2021055937 A1 | 3/2021 |
| WO | 2021101990 A1 | 5/2021 |
| WO | 2021138385 A1 | 7/2021 |
| WO | 2021168069 A1 | 8/2021 |
| WO | 2021174309 A1 | 9/2021 |
| WO | 2021191774 A1 | 9/2021 |
| WO | 2021228877 A1 | 11/2021 |
| WO | 2021233931 A1 | 11/2021 |
| WO | 2022038408 A1 | 2/2022 |

OTHER PUBLICATIONS

Electrical Technology (May 2016) "Brushless DC Motor (BLDC)—Construction, Working & Applications", available at https://www.electricaltechnology.org/2016/05/bldc-brushless-dc-motor-construction-working-principle.html.

Scargiali, Francesca (2007) "Gas-liquid Dispersions in Mechanically Agitated Contactors", PhD Thesis, University of Naples, Department Of Chemical, Materials And Industrial Production Engineering.

SPX Flow Inc. (Mar. 2019) "Lightnin Mixers General Overview", SPX®FLOW.

Chen et al., "High-Throughput Microporous Tube-in-Tube Microreactor as Novel Gas-Liquid Contactor: Mass Transfer Study," AlChE Journal 57, 2011, 239-249, DOI: 10.1002/aic.12260.

Conway et al., 2002, "Gas-liquid-solid operation of a vortex-ingesting stirred tank reactor," Trans IChemE Part A, 80, 839-845. DOI: 10.1205/026387602321143372.

Heyouni et al., "Hydrodynamics and mass transfer in gas-liquid flow through static mixers,", Chemical Engineering Science 57 (2002), 3255-3333. DOI: 10.1016/80009-2509(02)00202-6.

Moucha et al., "Gas hold-up, mixing time and gas-liquid volumetric mass transfer coefficient of various multiple-impeller configurations: Rushton turbine, pitched blade and techmix impeller and their combinations," Chemical Engineering Science 58, (2003) 1839-1846 DOI: doi:10.1016/S0009-2509(02)00682-6.

Stelmach et al., "Analysis of the Mechanism of Gas Bubble Break-Up in Liquids During the Self-Aspirating Impeller Operation," Chemical and Process Engineering 37 (2016), 441-457. DOI: 10.1515/cpe-2016-0037.

Tan et al., "Development of a membrane dispersion micro-absorber for CO2 capture," Journal of Membrane Science 385-386, 2011, 123-131. DOI: doi:10.1016/j.memsci.2011.09.034.

\* cited by examiner

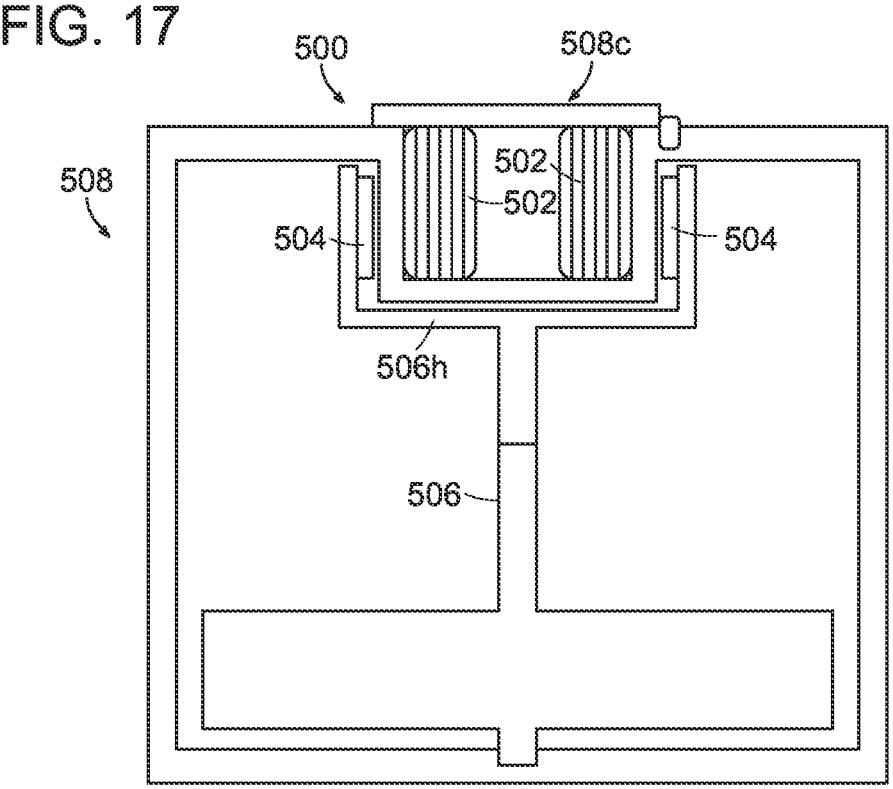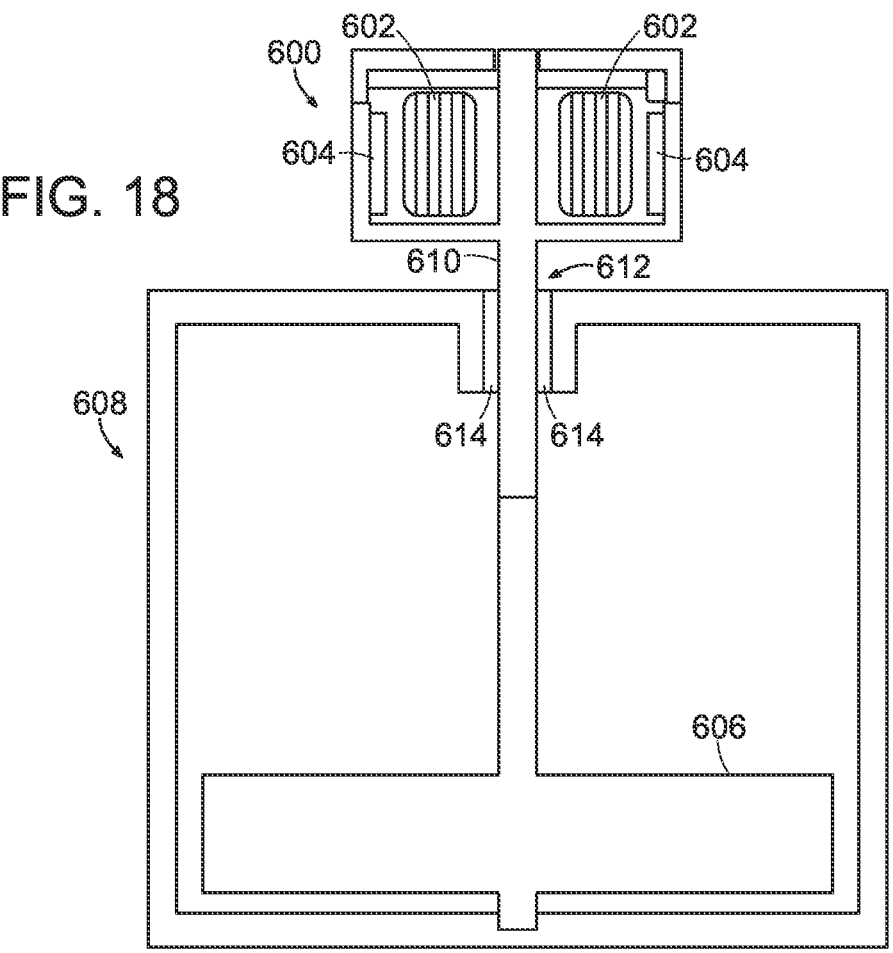

AGITATOR FOR A CARBONATION SYSTEM

CROSS-REFERENCE TO RELATED APPLICATIONS

This application is a continuation of Intl. App. No. PCT/CN2022/092688 entitled "Agitator For A Carbonation System" filed May 13, 2022, which is hereby incorporated by reference in its entirety.

FIELD

The present disclosure generally relates to an agitator for a carbonation system.

BACKGROUND

Various beverage carbonation systems are available that dispense carbonated beverages, for example, carbonated water. In some instances, the carbonated water can be flavored. Such beverage carbonation systems can be used in various locations by consumers, such as in homes or offices, to carbonate liquid and dispense the carbonated liquid on demand.

Beverage carbonation systems can provide the carbonated water by mixing carbon dioxide ($CO_2$) gas with water to dissolve the $CO_2$ in the water. Various mixing methods exist. For example, a beverage carbonation system can introduce water from a water source into a chamber and can also introduce $CO_2$ into the chamber from a $CO_2$ source. The water and $CO_2$ can then be mixed together in the chamber. However, such mixing can be inefficient, including in some cases undesirable amounts of the $CO_2$ in the chamber not being dissolved into the water. The excess, undissolved $CO_2$ is released from the chamber and is therefore wasted by not being mixed with water for dispensing. The $CO_2$ source, such as a canister or other container, of the beverage carbonation system may thus need replacing more often than if mixing was more efficient because each mixing operation requires more $CO_2$ than is able to be mixed with water. Additionally, the speed of forming the carbonated beverage is lower if the mixing operation is inefficient. A more efficient mixing operation increases the achievable speed of dissolution without requiring unreasonably high $CO_2$ pressure.

Accordingly, there remains a need for improved devices, systems, and methods for carbonation systems.

SUMMARY

In general, agitators for a carbonation system, systems including an agitator for a carbonation system, and methods including an agitator for a carbonation system are provided.

In one aspect, an agitator for use in a carbonation mixing apparatus is provided that in one embodiment includes a rotatable elongate shaft having an upper end and a lower end. The agitator also includes a plurality of arms extending radially outward from the elongate shaft relative to a longitudinal axis of the elongate shaft. The plurality of arms are positioned adjacent to the lower end of the elongate shaft, and each of the arms includes a first portion proximate the elongate shaft and a second portion that is radially outward from the first portion and from the elongate shaft. The first portion extends at a first angle relative to the longitudinal axis of the elongate shaft, and the second portion extends at a second, different angle relative to the longitudinal axis such that each of the arms has an angled outer tip.

The agitator can vary in any number of ways. For example, the first portion of each of the plurality of arms can be substantially perpendicular to the longitudinal axis of the elongate shaft. In some embodiments, the second portion of each of the plurality of arms can be at an acute angle relative to the first portion.

For another example, the first and second portions of each of the plurality of arms can define a paddle shape of the arm.

For still another example, the second portion of each of the arms can include a plurality of fingers that extend radially outward and are configured to allow a gas to pass between adjacent ones of the fingers during rotation of the agitator. In some embodiments, the agitator is configured to rotate about a longitudinal axis of the elongate shaft.

For another example, an outer edge of the second portion of each of the arms can be a continuous substantially planar edge.

For yet another example, the agitator can also include a flange extending radially outward from the elongate shaft, and each of the arms can be located at least partially below the flange. In some embodiments, the first portion of each arm can abut a surface of the flange.

For still another example, the agitator can also include at least one inner lumen extending through the elongate shaft and having an upper opening and a lower opening. In some embodiments, the plurality of arms can be positioned adjacent to the lower opening; the agitator can also include a central bore extending through the elongate shaft, and the at least one inner lumen can be positioned radially outward of the central bore; and/or the at least one inner lumen can include first and second inner lumens.

For yet another example, the elongate shaft can have a cavity extending therethrough, and the cavity can have an upper opening at the upper end and a lower opening at the lower end. In some embodiments, the cavity can include a central bore extending along the longitudinal axis of the elongate shaft and can include at least one lumen positioned radially outward of the central bore, and the at least one lumen can include the upper opening and the lower opening. In some embodiments, the at least one inner lumen includes first and second inner lumens surrounding the central bore.

For still another example, the agitator can also include a central bore extending through the elongate shaft.

For yet another example, the elongate shaft and the plurality of arms can be configured to rotate about the longitudinal axis of the elongate shaft.

For still another example, the elongate shaft can be configured to be operably coupled to a motor configured to drive rotation of the agitator.

For another example, the agitator can include at least one inner lumen extending through the elongate shaft, and the at least one inner lumen can have an upper opening and a lower opening. In some embodiments, gas can be configured to flow through the at least one inner lumen. In some embodiments, the gas can be configured to flow into the at least one inner lumen through the upper opening and to exit the at least one inner lumen through the lower opening. The gas can be configured to flow into the at least one inner lumen through the upper opening such that the gas circulates in a chamber by flowing into the at least one inner lumen through the upper opening and exiting the at least one inner lumen through the lower opening.

For another example, each of the arms can be directly attached to the elongate shaft.

For yet another example, the agitator can also include a flange that extends radially and through which the elongate shaft extends, and each of the arms can be located at least partially below the flange.

In another aspect, a system is provided that in one embodiment includes a chamber configured to receive liquid from a liquid source and gas from a gas source. The system also includes an agitator disposed within the chamber and having an elongate shaft and having a plurality of arms extending radially outward from the elongate shaft. Each of the plurality of arms has an angled outer tip. When the chamber contains the liquid and the gas and the agitator is partially disposed within the liquid, the agitator is configured to be rotated by the motor to mix the gas and the liquid.

The system can have any number of variations. For example, each of the plurality of arms can extend from the elongate shaft substantially perpendicular to a longitudinal axis of the elongate shaft. In some embodiments, the outer tip of each of the plurality of arms can be at an acute angle relative to the longitudinal axis of the elongate shaft.

For another example, each of the plurality of arms can have a paddle shape.

For yet another example, the elongate shaft of the agitator can have at least one inner lumen extending therethrough between an upper opening and a lower opening, the arms can be positioned adjacent to the lower opening, and when the chamber contains the liquid and the gas and the agitator is partially disposed within the liquid and is rotated by the motor to mix the gas and the liquid, the gas above the liquid can be configured to flow into the upper opening of the elongate shaft, through the at least one inner lumen of the elongate shaft, and out the lower opening such that the gas exiting the lower opening reencounters the liquid.

For still another example, an outer edge of each of the arms can be defined by a plurality of fingers that extend radially outward and are configured to allow the gas to pass between adjacent ones of the fingers during the rotation of the agitator.

For another example, an outer edge of each of the arms can be a continuous substantially planar edge.

For yet another example, the system can also include a motor coupled to the agitator and configured to rotatably drive the agitator, and the motor can include a stator and a rotor. In some embodiments, the rotor can include a plastic magnet and/or the agitator can be magnetically coupled to the motor. In some embodiments, the agitator can be physically coupled to a first portion of the motor, and the first portion of the motor can be magnetically coupled to a second portion of the motor. The first portion can include the rotor, and the second portion can include the stator. In some embodiments, the agitator and the rotor can be disposed inside the chamber, and the stator can be disposed external to the chamber. The rotor can include a first magnet, the agitator can include a second magnet, and rotation of the rotor can be configured to drive the rotation of the agitator through interaction of the second magnet with the first magnet. The agitator can include an upper housing that houses the second magnet and can be located adjacent to the rotor. A wall of the chamber can separate the rotor and the stator. A bushing can separate the rotor and the stator. In some embodiments, the agitator can be disposed inside the chamber, and the stator and the rotor can be disposed external to the chamber.

For another example, the agitator can also include a flange that extends radially, and each of the arms can be located at least partially below the flange.

For yet another example, with the agitator rotating, the gas can be configured to circulate within the chamber by flowing into and out of the elongate shaft.

For another example, the agitator can be configured to rotate about a longitudinal axis of the elongate shaft.

For still another example, the gas can be carbon dioxide, and the liquid can be water.

For another example, the system can include a dispensing system configured to dispense a carbonated fluid formed by mixing the gas and the liquid.

In another aspect, a method is provided that in one embodiment includes activating a motor and thereby driving rotation of an agitator disposed within in a sealed chamber having liquid and gas therein such that the gas mixes with the liquid in the chamber to form a carbonated fluid. The agitator includes a plurality of arms extending radially outward at a first angle relative to a longitudinal axis of the elongate shaft, each of the plurality of arms has an outer tip extending at a second, different angle relative to the longitudinal axis of the elongate shaft, and the plurality of arms are configured to encourage the mixing of the gas and the liquid.

The method can vary in any number of ways. For example, gas located above the liquid can flow into an upper opening in an elongate shaft of the agitator and out of a lower opening of the elongate shaft of the agitator such that the gas mixes with the liquid in the chamber to form the carbonated fluid.

For another example, the first angle can be substantially 90°. In some embodiments, the second angle can be an acute angle.

For yet another example, the motor can include a stator and a rotor, the agitator and the rotor can be disposed inside the chamber, and the stator can be disposed external to the chamber.

For another example, the motor can drive the rotation of the agitator through interaction of a first magnet of the motor with a second magnet of the agitator.

For yet another example, the motor can drive the rotation of the agitator by causing rotation of a drive rod that is operably coupled to the agitator.

For still another example, the gas can repeatedly flow into an upper opening of an elongate shaft of the agitator and out of a lower opening of the elongate shaft so as to circulate in the chamber.

For another example, the method can also include dispensing, with a dispensing system, the carbonated fluid into a container for a user.

For still another example, the gas can be carbon dioxide, and the liquid can be water.

For another example, the agitator can rotate about a longitudinal axis of an elongate shaft of the agitator.

BRIEF DESCRIPTION OF DRAWINGS

This disclosure will be more fully understood from the following detailed description taken in conjunction with the accompanying drawings, in which:

FIG. 17 is a cross-sectional schematic view of another embodiment of a chamber having another embodiment of an agitator disposed therein and operatively coupled to one embodiment of a motor;

FIG. 18 is a cross-sectional schematic view of another embodiment of a chamber having another embodiment of an agitator disposed therein and operatively coupled to another embodiment of a motor;

DETAILED DESCRIPTION

Figure 1:
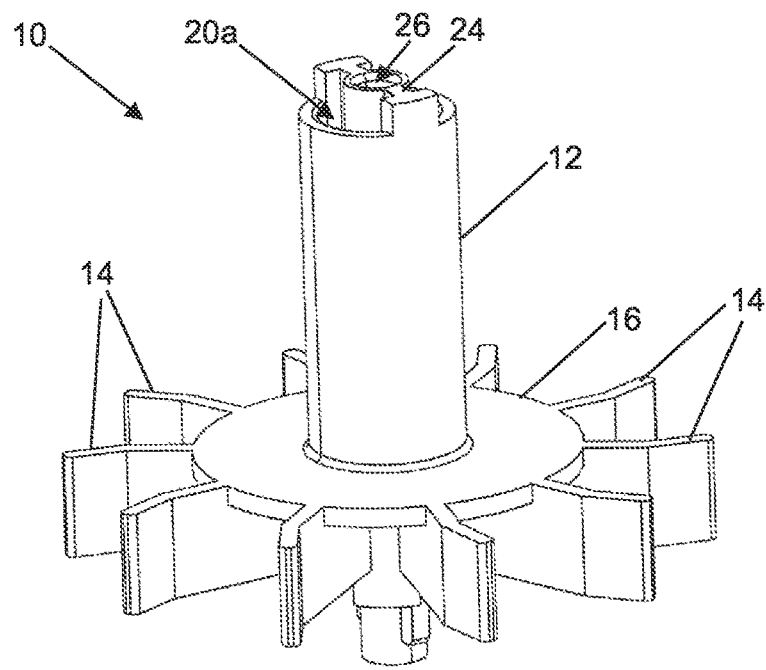
FIG. 1 is a perspective view of one embodiment of an agitator.
Figure 2:
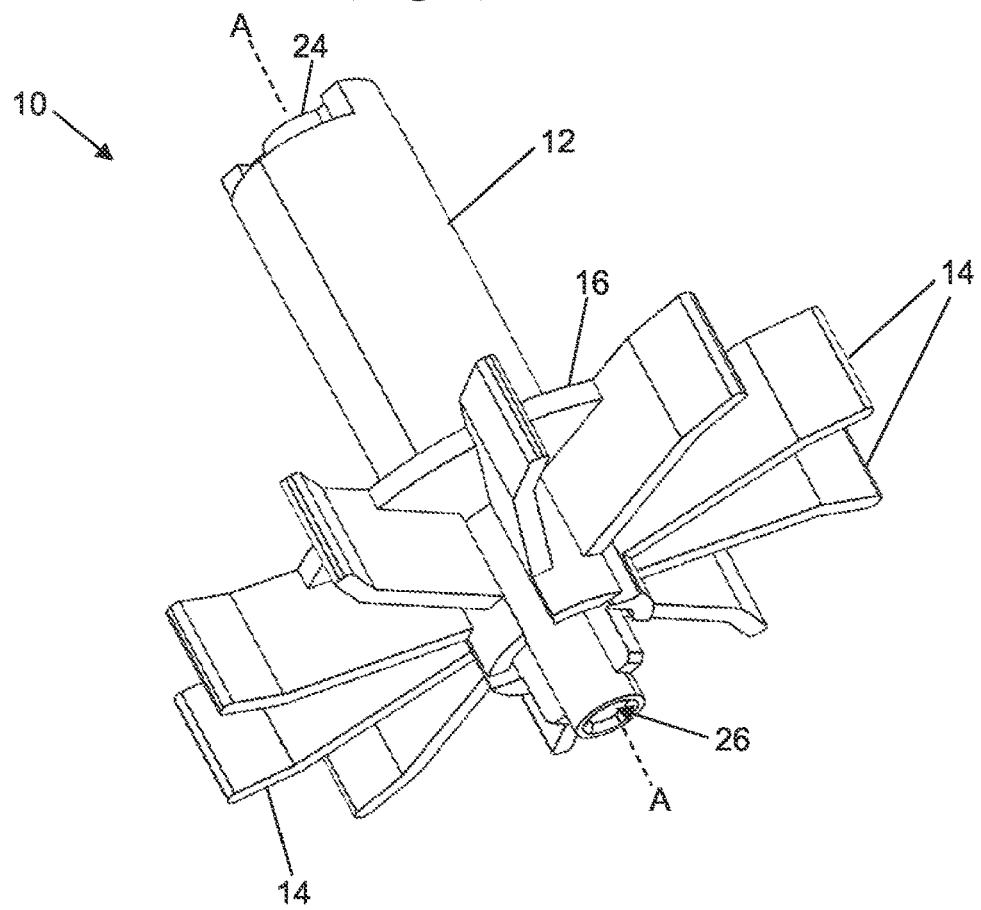
FIG. 2 is another perspective view of the agitator of FIG. 1.
Figure 3:
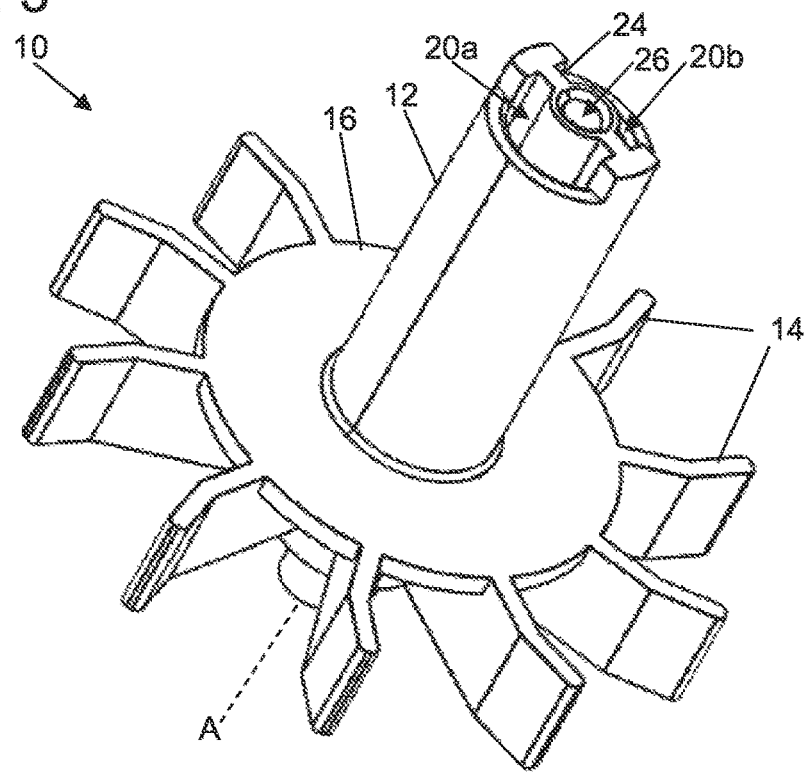
FIG. 3 is yet another perspective view of the agitator of FIG. 1.
Figure 4:
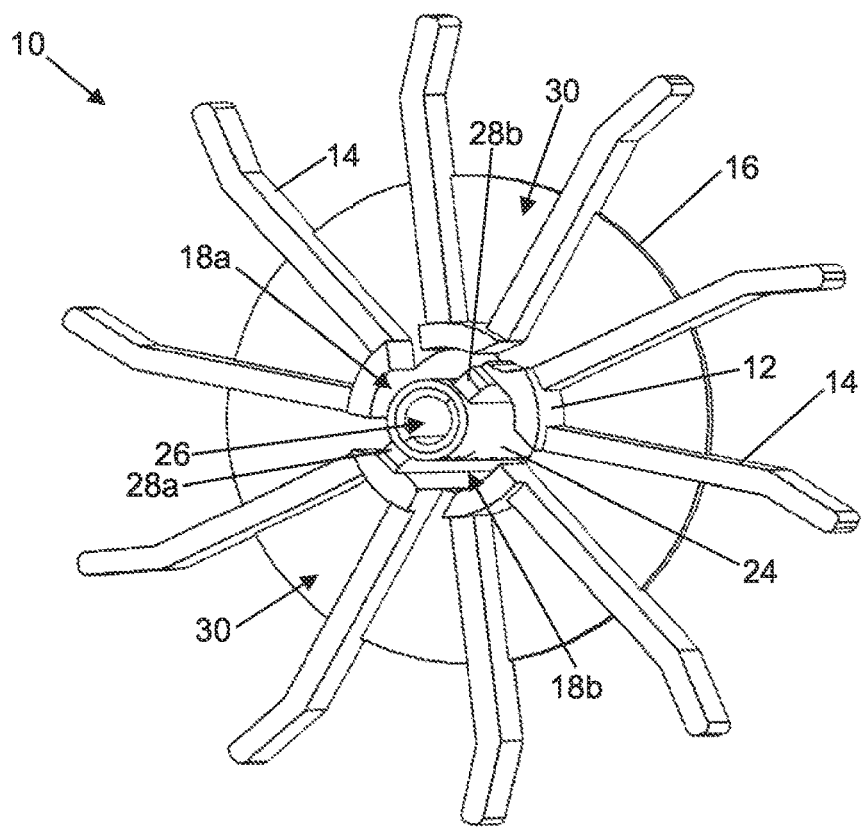
FIG. 4 is still another perspective view of the agitator of FIG. 1.
Figure 5:
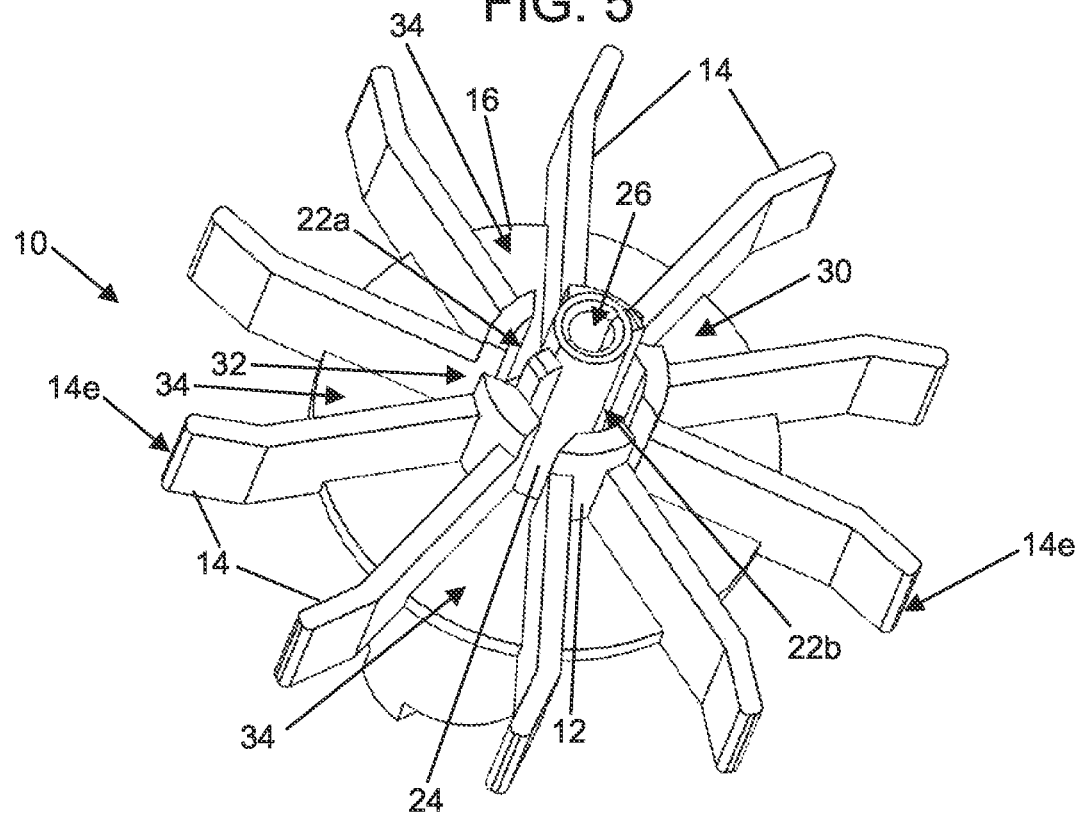
FIG. 5 is another perspective view of the agitator of FIG. 1.
Figure 6:
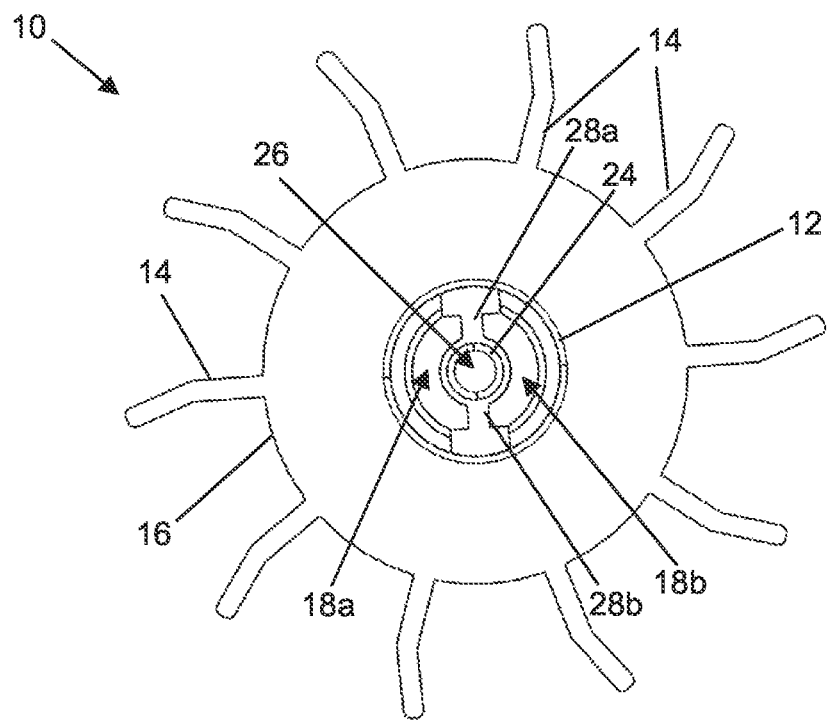
FIG. 6 is a top view of the agitator of FIG. 1.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary agitators for a carbonation system, systems including an agitator for a carbonation system, and methods including an agitator for a carbonation system are provided. In general, an agitator (also referred to herein as an "impeller") is configured to rotate in a chamber to mix together a gas, such as carbon dioxide ($CO_2$), and a liquid, such as water, to form a carbonated fluid. The agitator includes a plurality of paddles (also referred to herein as "arms") configured to encourage the mixing of the gas and the fluid by agitating the gas and the liquid during the agitator's rotation. Each of the arms has a shape configured to allow for efficient mixing of the gas and liquid in which most or all of the gas and the liquid are mixed together such that a low amount of gas and liquid is wasted in each mixing operation. Each of the arms has an angled outer tip to facilitate the efficient mixing.

The agitator includes a hollow shaft through which the gas is configured to flow during the agitator's rotation. The gas flowing through the agitator's hollow shaft may improve efficacy of the agitator over use of the paddles alone to mix the gas and the fluid because the flow through the hollow shaft encourages circulation of the gas within the chamber and into the liquid during the mixing process. Less gas may therefore be wasted in the mixing process since the agitator can allow more gas to be mixed into the liquid.

The agitator can be part of a carbonation system configured to dispense the carbonated fluid as a beverage, such as by dispensing the carbonated fluid into a cup, a bottle, or other container. The agitator can be configured to rotate on user demand, e.g., in response to the user pressing a button on the carbonation system or otherwise providing an input to the carbonation system, so that the carbonated fluid is freshly prepared for the user. In some embodiments, a carbonation level of the carbonated fluid is preset such that the carbonated fluid has a predetermined amount of carbonation. In such instances, a same amount of $CO_2$ is introduced into the chamber for each mixing process. The agitator may efficiently mix the gas and the liquid each time with minimal $CO_2$ waste. In other embodiments, the carbonation system can be configured to allow the user to select a level of carbonation such that the carbonated fluid has an amount of carbonation according to the user's personal preference. In such instances, a different amount of $CO_2$ is introduced into the chamber for each mixing process, e.g., more $CO_2$ for more carbonation and less $CO_2$ for less carbonation. The agitator including the hollow shaft may efficiently mix the gas and the liquid each time with minimal $CO_2$ waste regardless of the selected carbonation level because the gas can flow through the agitator's hollow shaft during the mixing process to encourage mixing with a relatively small headspace volume in the chamber. A central vortex may be formed around the rotating shaft of the agitator such that gas may also be encouraged by the agitator to dissolve into the liquid by being directed by the vortex into the liquid without the gas having been so directed by exiting the hollow shaft.

Similarly, in some embodiments, an amount of the liquid used in forming the carbonated fluid is preset while in other embodiments the carbonation system can be configured to allow the user to select an amount of liquid, e.g., an amount of carbonated fluid to be dispensed to the user. The agitator's hollow shaft may allow the agitator to efficiently mix the gas and the liquid each time with minimal $CO_2$ waste regardless of the amount of liquid being mixed with gas because the gas can flow through the agitator's hollow shaft during the mixing process to encourage mixing, even when the chamber is substantially filled with liquid and only a small headspace is available.

A motor is configured to drive the rotation of the agitator. The carbonation system can also include the motor. The mixing of the gas and the liquid in the chamber must be a food safe environment when producing carbonated fluid for drinking, e.g., a carbonated beverage. Thus, if the motor that drives the agitator uses lubricant, the lubricant must be prevented from entering the chamber or otherwise being exposed to the gas and/or the liquid because lubricant is typically not food safe. Additionally, the chamber is at high pressure during the mixing of the gas and the liquid. The high pressure can cause damage over time, such as by weakening or breaking a seal between the motor and the chamber. For example, a rotating shaft of the motor can extend into the chamber to rotate an agitator within the chamber with a seal of rubber, silicone, etc. being provided between the motor shaft and the chamber. Over time, the seal can erode due to the rotating shaft rubbing against the seal, the high pressure in the chamber, and/or the seal's exposure to the gas and/or liquid in the chamber. If the seal erodes a sufficient amount, gas and/or liquid in the chamber may be able to escape from the chamber, which can potentially render the carbonation system unusable.

In an exemplary embodiment, the motor configured to drive the agitator includes a brushless direct current (BLDC) motor that includes a stator and a rotor. The rotor can include a permanent magnet, and the stator can include metallic coils electrically coupled to a DC source. DC current provided to the stator is configured to create an electromagnetic field, which is configured to cause the rotor to rotate such that the motor can provide a rotational driving force. The rotor is operably coupled to the agitator such that the rotational driving force is provided to the agitator, thereby causing rotation of the agitator. In an exemplary embodiment, the rotor is located inside the chamber (in which the agitator is located), and the stator is located outside of the chamber. The rotor and the agitator each being located in the chamber may provide less risk of seal erosion because no seal is needed between the motor and chamber. Also with the rotor and the agitator each being located in the chamber, no lubricant is needed, thereby helping to preserve a food safe environment.

In other embodiments, the motor configured to drive the agitator can be disposed outside of the chamber. Such a motor location may be desirable, for example, in modifying existing carbonation system designs, in which a motor is located outside of the mixing chamber, to include an agitator as described herein. The modified carbonation system may thus achieve the various one or more benefits of the agitator described herein.

FIGS. 1-7 illustrate one embodiment of an agitator 10 for a carbonation system. The agitator 10 includes an elongate shaft 12, a plurality of arms 14, and a flange 16.

In an embodiment, the agitator 10 is rigid, with each of the elongate shaft 12, the arms 14, and the flange 16 being formed of a rigid material (same material or one or more different materials), such as a metal or a rigid polymer. The agitator 10 being rigid may help the agitator 10 stably rotate in the chamber in which gas and liquid are being mixed to form a carbonated fluid.

The elongate shaft 12 defines a central spindle of the agitator 10. The elongate shaft 12 has an inner lumen extending therethrough. The inner lumen is configured to have a gas flowing therethrough during a mixing process in which the agitator is rotating in a mixing chamber to mix the gas with a liquid to form a carbonated fluid. The inner lumen extends longitudinally through the elongate shaft 12 from an upper (e.g., proximal) opening of the elongate shaft 12 to a lower (e.g., distal) opening of the elongate shaft 12. The upper opening of the elongate shaft 12 is configured to be an entrance for the gas into the inner lumen, and the lower opening of the elongate shaft 12 is configured to be an exit for the gas from the inner lumen. As discussed further herein, the gas located in the chamber in which the agitator is also located can circulate through the inner lumen by repeatedly entering and exiting the inner lumen during the mixing process. The inner lumen in this illustrated embodiment includes a pair of inner lumens 18a, 18b such that the elongate shaft 12 includes a pair of upper openings 20a, 20b and a pair of lower openings 22a, 22b. Each of the inner lumens 18a, 18b has a C-shape in this illustrated embodiment but can have another shape. In other embodiments, the inner lumen can be a single lumen or can include more than two inner lumens. In some embodiments, a number of the inner lumens can equal a number of the agitator's arms. Each of the arms may thus have an independent flow path along the agitator's elongate shaft and have a dedicated inner lumen, which may help each arm more efficiently dissolve the gas into the liquid since each arm may receive gas from headspace in a chamber in which the agitator is rotating more independently as determined by the individual fluid conditions for that arm at any given moment during the mixing operation.

The elongate shaft 12 includes a stabilizing member 24 extending longitudinally therethrough and across a diameter of the elongate shaft 12 along the elongate shaft's longitudinal length. The stabilizing member 24 forms a barrier between the pair of inner lumens 18a, 18b along the longitudinal length of the elongate shaft 12. The stabilizing member 24 is configured to provide stability to the agitator 10 during the agitator's rotation. The stabilizing member 24 can have a variety of shapes. In this illustrated embodiment, the stabilizing member 24 has a generally I-shaped cross-sectional shape with a circular shape at a center of the "I."

The elongate shaft 12 also has a central bore 26 extending therethrough. The central bore 26 defines a longitudinal axis A of the agitator 10 and defines a hollow core of the agitator 10. The central bore 26 is formed in the stabilizing member 24 at the center thereof, e.g., at the stabilizing member's central circular shape. The central bore 26 is configured to seat therein a drive rod (not shown in FIGS. 1-7) configured to operably couple the agitator 10 to a motor (not shown in FIGS. 1-7) configured to drive the agitator 10. The central bore 26 has a cylindrical shape and a circular cross-sectional shape in this illustrated embodiment to seat a cylindrical drive rod therein but can have other shapes, e.g., to correspond to a non-cylindrically shaped drive rod such as a drive rod with a hexagonal cross-sectional shape, with a square cross-sectional shape, with an irregular shape, etc. As discussed further below, the motor is configured to cause the drive rod to rotate, thereby causing the agitator 10 to rotate. The agitator 10 is configured to rotate about the agitator's longitudinal axis A.

In embodiments in which the inner lumen of the agitator 10 is a single lumen, the stabilizing member 24 can not extend across the diameter of the elongate shaft 12 such that the single inner lumen is ring-shaped around a cylindrically-shaped stabilizing member 24 through which the central bore 26 extends. In embodiments in which the inner lumen of the agitator 10 includes more than two inner lumens, the stabilizing member 24 can have more than two spokes 28*a*, 28*b* that define the pair of inner lumens 18*a*, 18*b* in the illustrated embodiment of FIGS. 1-7.

The plurality of arms 14 of the agitator 10 extend radially outward relative to the longitudinal axis A of the agitator 10. The arms 14 are configured to encourage mixing of the gas and the fluid by agitating the gas and the liquid during the agitator's rotation. The arms 14 are spaced equidistantly around the elongate shaft 12, and thus around the agitator's longitudinal axis A and around the central bore 26. Being equidistantly spaced from one another may help the arms 14 evenly mix the gas and the liquid. The agitator 10 includes ten arms 14 in this illustrated embodiment but can include another plural number of arms.

The arms 14 are located in a lower (e.g., distal) portion of the agitator 10. As discussed further herein, the agitator 10 is configured to be disposed in a chamber for mixing a gas and a liquid. The arms 14 being located in the lower portion of the agitator 10 may help the arms 14 be in contact with and at least partially submerged in the liquid in the chamber, which due to gravity tends to settle at a bottom of the chamber, thereby helping the rotating arms 14 to agitate the liquid to form the carbonated fluid. The arms 14 are also located above (e.g., proximal to) the lower opening 22*a*, 22*b* of the inner lumen 18*a*, 18*b* of the elongate shaft 12. Thus, gas exiting the inner lumen 18*a*, 18*b* through the lower opening 22*a*, 22*b* will enter into the liquid and rise in the liquid in the chamber in which the agitator 10, the liquid, and the gas are located. The rising gas will thus encounter the arms 14, thereby helping the rotating arms 14 to agitate the gas to form the carbonated fluid.

The agitator 10 and the chamber are relatively sized such that the agitator 10 is configured to be at least partially disposed within liquid that is in the chamber. In other words, liquid level in the chamber is configured to be at an axial position along the agitator 10 at or below an uppermost end of the agitator 10. In an exemplary embodiment, the arms 14 are configured to be at least partially disposed within the liquid that is in the chamber such that the arms 14 will be able to contact the liquid for effective mixing. The carbonation system that includes the agitator 10 and the chamber can be configured to cause a minimum amount of liquid to enter the chamber for each mixing operation such that the arms 14 are at least partially disposed within the liquid that is in the chamber so the arms 14 for every mixing operation will be able to contact the liquid for effective mixing.

Each of the arms 14 has a same shape, which may help the arms 14 evenly agitate the gas and the liquid in the chamber. The shape of the arms 14 can vary in different embodiments. In this illustrated embodiment, each of the arms 14 includes a first portion 14*a* and a second portion 14*b* that is radially outward from the first portion 14*a*. The first portion 14*a* extends at a first angle relative to the longitudinal axis A of the elongate shaft 12, agitator 10, and central bore 26. The second portion 14*b* extends at a second, different angle relative to the longitudinal axis A such that each of the arms 14 has angled outer tip. The angled outer tip of each arm 14 may help urge movement of the liquid and gas in the chamber and thus help form the carbonated fluid. The first and second portions 14*a*, 14*b* of the agitator 10 define a paddle shape of each arm 14. The first angle in this illustrated embodiment is substantially 90° such that each arm 14 is substantially perpendicular to the longitudinal axis A. A person skilled in the art will appreciate that a value may not be precisely at a value, and that two elements may not be precisely perpendicular to one another, but nevertheless be considered to be substantially at that value or substantially perpendicular due to any number of factors, such as manufacturing tolerances and sensitivity of measurement equipment. The arms 14 thus each extend transversely from the elongate shaft 12, in this embodiment substantially perpendicular to the elongate shaft 12. The second angle can be any angle above 0° and less than 180°. In an exemplary embodiment, the second angle is an acute angle, as in this illustrated embodiment, which may better help urge more movement of the liquid and gas in the chamber than a larger angle.

In this illustrated embodiment, the second portion 14*b* of each of the arms 14*a* is angled radially relative to the first portion 14*a*, as discussed above, but is not angled axially relative to the first portion 14*a*. In other embodiments, the second portion 14*b* of each of the arms 14*a* can be angled axially relative to the first portion 14*a* so as to point upward (proximally) or downward (distally).

The arms 14 extend radially outward directly from the elongate shaft 12 of the agitator 10, which may allow the arms 14 and the elongate shaft 12 to be integrally formed as a single piece, such as by molding. In other embodiments, a connector element can be used to fixedly connect the arms 14 to the elongate shaft 12, which may allow the arms 14 and the elongate shaft 12 to be formed from different materials.

As shown in FIGS. 2, 4, 5, and 7, the agitator 10 in this illustrated embodiment includes alternate gaps 32 between the arms 14 below the flange 16. The gaps 32 are configured to allow gas exiting the lower opening 22*a*, 22*b* to pass therethrough. The agitator 10 is thus configured to direct gas between alternating spaces 34 between adjacent arms 14. In other embodiments, the gaps 32 can be present between every arm 14 such that the agitator 10 is configured to direct gas between each space between adjacent arms 14.

The flange 16 of the agitator 10 extends radially outward relative to the longitudinal axis A of the agitator 10. The flange 16 is configured to provide structural rigidity to the arms 14 and aid in stabilizing the arms 14, particularly during the rotation of the arms 14 about the agitator's longitudinal axis A. The flange 16 is a ring-shaped disc in this illustrated embodiment and has a central hole. The elongate shaft 12 extends through the central hole of the flange 16. The elongate shaft 12 thus extends through the flange 16 with a first portion of the elongate shaft 12 extending above (proximal to) the flange 16 and a second portion of the elongate shaft 12 extending below (distal to) the flange 16.

The flange 16 is located in the lower (e.g., distal) portion of the agitator 10. The arms 14 are each located at least partially below the flange 16. The flange 16 is configured to encourage mixing of the liquid and the gas in the chamber in which the agitator 10 is also located by encouraging the gas and liquid under the flange 16 to be agitated by the arms 14. The flange 16 is also configured to guide the gas that exits the inner lumen away from the lower opening through which the gas exited to urge the gas away from re-entering the inner lumen through the lower opening and to urge the gas in a direction towards the region of high shear and efficient bubble fragmentation. As mentioned above, liquid will tend to settle at the bottom of the chamber, and gas flowing through the agitator's inner lumen 18*a*, 18*b* is configured to exit the inner lumen 18*a*, 18*b* through the lower opening 22a, 22b, which is located below the flange 16. In this illustrated embodiment, none of the arms 14 are located above the flange 16.

The flange 16 is directly attached to the arms 14 in this illustrated embodiment. The arms 14 extend radially outward from an outer circumferential edge of the flange 16 and from a bottom (underside) surface 30 of the flange 16. The flange 16, the arms 14, and the elongate shaft 12 are thus integrally formed as a single piece in this illustrated embodiment. In other embodiments, a connector element can be used to fixedly connect the arms 14 to the flange 16, which may allow the arms 14 and the flange 16 to be formed from different materials.

The flange 16 can include a plurality of passages extending therethrough, with each of the flange's passages corresponding to and being in fluid communication with one of the elongate shaft's inner lumens. A number of the flange's passages is thus equal to a number of the elongate shaft's inner lumens. The flange's passages define exit openings of the elongate shaft's inner lumens, e.g., instead of a gas exiting the first and second inner lumens 18a, 18b through the lower openings 22a, 22b of the elongate shaft 12 the gas would exit the first inner lumen 18a, enter a first passage formed in the flange 16, and exit out an open end of the first passage and the as would exit the second inner lumen 18b, enter a second passage formed in the flange 16, and exit out an open end of the second passage. The flange including a plurality of passages allows gas to exit radially farther outward (compared to exiting out of the elongate shaft's inner lumen), which may help deliver the gas into liquid into which the gas is being dissolved.

The agitator 10 is configured to facilitate formation of a carbonated fluid and can be part of a carbonation system configured to dispense the carbonated fluid to a user to drink. The carbonation system can have a variety of configurations. In some embodiments, the carbonation system can be configured to add an enhancement such as flavoring to the carbonated fluid.

The arms 14 of the agitator 10 shown in FIGS. 1-7 each have a substantially planar edge 14e that is an outer edge of the arm's second portion 14b. A person skilled in the art will appreciate that a surface may not be precisely planar but nevertheless be considered to be substantially planar due to any number of factors, such as manufacturing tolerances and sensitivity of measurement equipment. In other embodiments, each arm of an agitator can have a non-planar edge.

Figure 7:
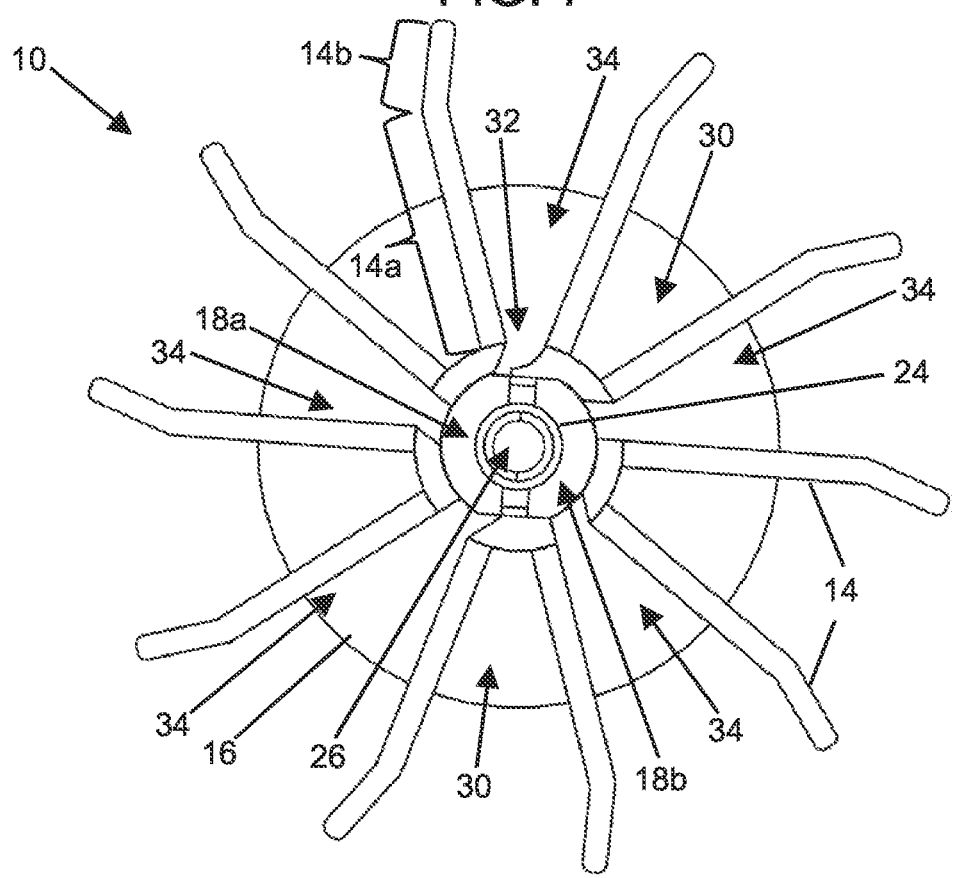
FIG. 7 is a bottom view of the agitator of FIG. 1.
Figure 7A:
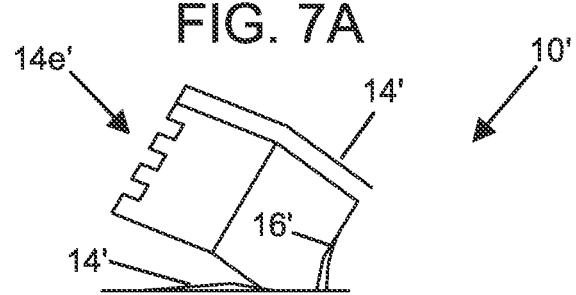
FIG. 7A is a perspective view of a portion of another embodiment of an agitator.

FIG. 7A illustrates one embodiment of an agitator 10' that is generally configured and used similar to the agitator 10 of FIGS. 1-7 except each arm 14' of an agitator 10' (only partially shown in FIG. 7A) has a non-planar edge 14e'. Only two arms 14' are shown in FIG. 7A (one of the arms 14' is partially obscured), but the agitator 10' includes a plurality of arms 14' similar to that discussed above regarding the agitator 10 of FIGS. 1-7. The agitator 10' of FIG. 7A also includes a flange 16' similar to the flange 16 of the agitator 10 of FIGS. 1-7. Each of the agitator's arms 14' has first and second portions similar to the first and second portions 14a, 14b of the arms 14 of the agitator 10 of FIGS. 1-7. The non-planar edge 14e' of FIG. 7A is thus similarly an outer edge of the arm's second portion. The non-planar edge 14e' includes a plurality of fingers that each extend radially outward such that the second portion of the arm 14' is toothed similar to a comb. The toothed configuration of the arms 14' is configured to, with the agitator 10' rotating in a chamber to mix a liquid and a gas as discussed herein, generate an array of counter-rotating vortices. Thus, bubbles of gas passing through a gap between each of the fingers can be broken into smaller bubbles. In general, smaller bubbles are preferable in enhancing gas dissolution to form a carbonated fluid quickly and efficiently.

Figure 8:
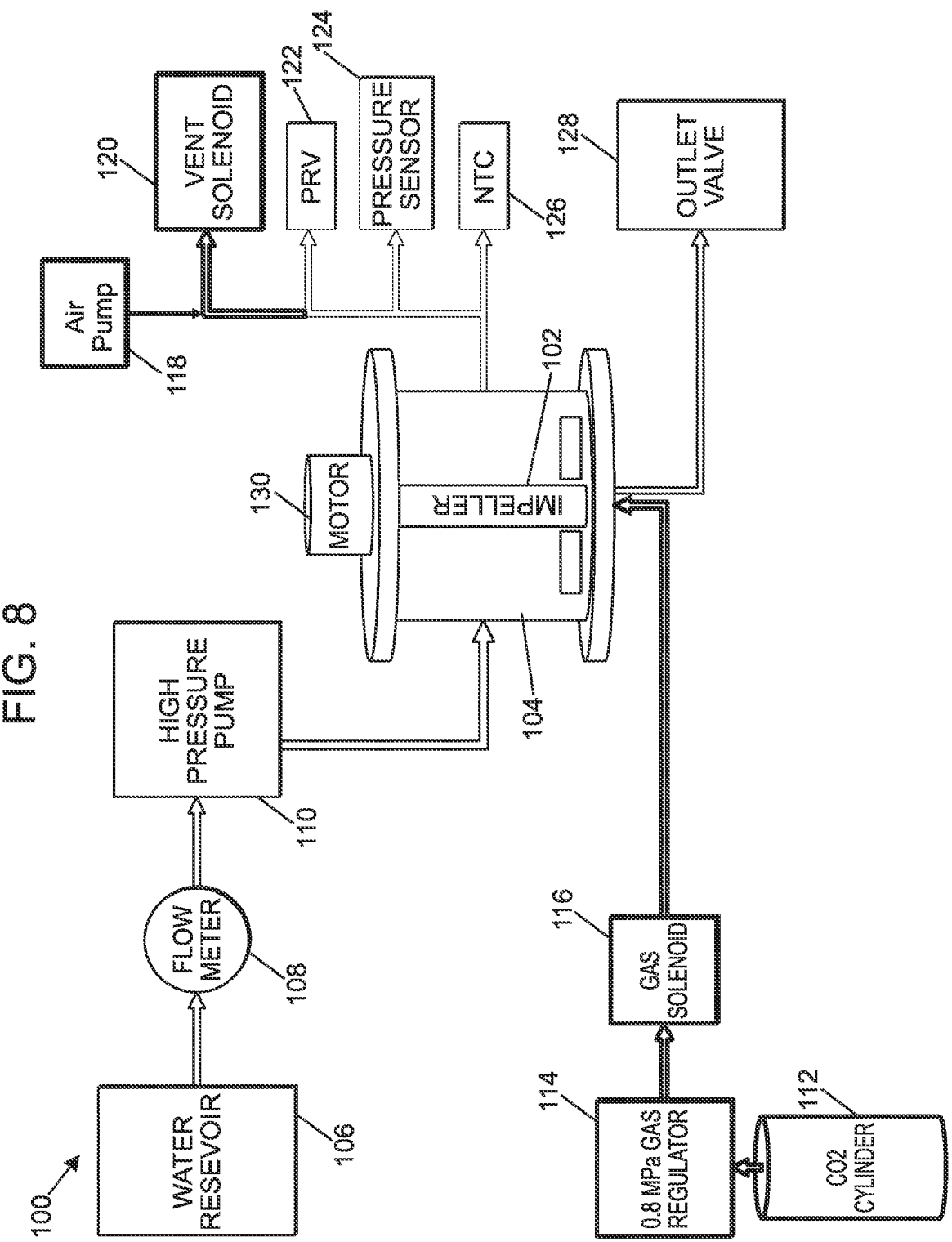
FIG. 8 is a schematic view of one embodiment of a carbonation system.

FIG. 8 illustrates one embodiment of a carbonation system 100 including an agitator (labelled "impeller" in FIG. 8) 102 disposed in a chamber 104 in which the agitator 102 is configured to rotate to form a carbonated fluid. The agitator 102 can be the agitator 10 of FIGS. 1-7 or other agitator described herein. The carbonation system 100 also includes a liquid source 106 configured to be a source of liquid for mixing in the chamber 104, a flow meter 108 configured to regulate an amount of liquid that flows from the liquid source 106 to the chamber 104, and a high pressure pump 110 configured to pump liquid from the liquid source 106 to the chamber 104. The liquid is water in this illustrated embodiment such that the liquid source 106 is a water reservoir, but another liquid can be used, such as juice.

The carbonation system 100 also includes a gas source 112 configured to be a source of gas for mixing in the chamber 104, a gas regulator 114 configured to regulate an amount of gas that flows from the gas source 112 to the chamber 104, and a gas solenoid valve 116 configured to open and close to selectively allow the gas to flow from the gas source 112 to the chamber 104. The gas is $CO_2$ such that the gas source 112 is a $CO_2$ cylinder in this illustrated embodiment but another gas can be used (in which case the resulting fluid of the mixing operation would not be a "carbonated" fluid but would be a treated fluid). The gas regulator 114 is an 0.8 MPa gas regulator in this illustrated embodiment but other gas regulators can be used.

The carbonation system 100 also includes an air pump 118 configured to drive a flow of the carbonated fluid out of the chamber 104 through an outlet valve 128, a vent solenoid valve 120 configured to allow excess pressure to be released from the chamber 104 with the vent solenoid valve 120 open, a pressure reducing valve (PRV) 122, a pressure sensor 124 configured to measure pressure in the chamber 104, and a temperature sensor 126 configured to measure temperature in the chamber 104. The temperature sensor 126 is a negative temperature coefficient (NTC) thermistor in this illustrated embodiment, but another type of temperature sensor can be used.

The carbonation system 100 also includes the outlet valve 128, which is configured to selectively open to allow the carbonated fluid to exit the chamber 104, e.g., for dispensing into a container such as a cup, a bottle, etc.

The carbonation system 100 also includes a motor 130 configured to drive the rotation of the agitator 102. The motor 130 is shown disposed outside of and above the chamber 104 in this illustrated embodiment but, as discussed further below, a first portion of the motor 130 can be disposed inside the chamber 104 and a second portion of the motor 130 can be disposed outside of the chamber 104.

Figure 9:
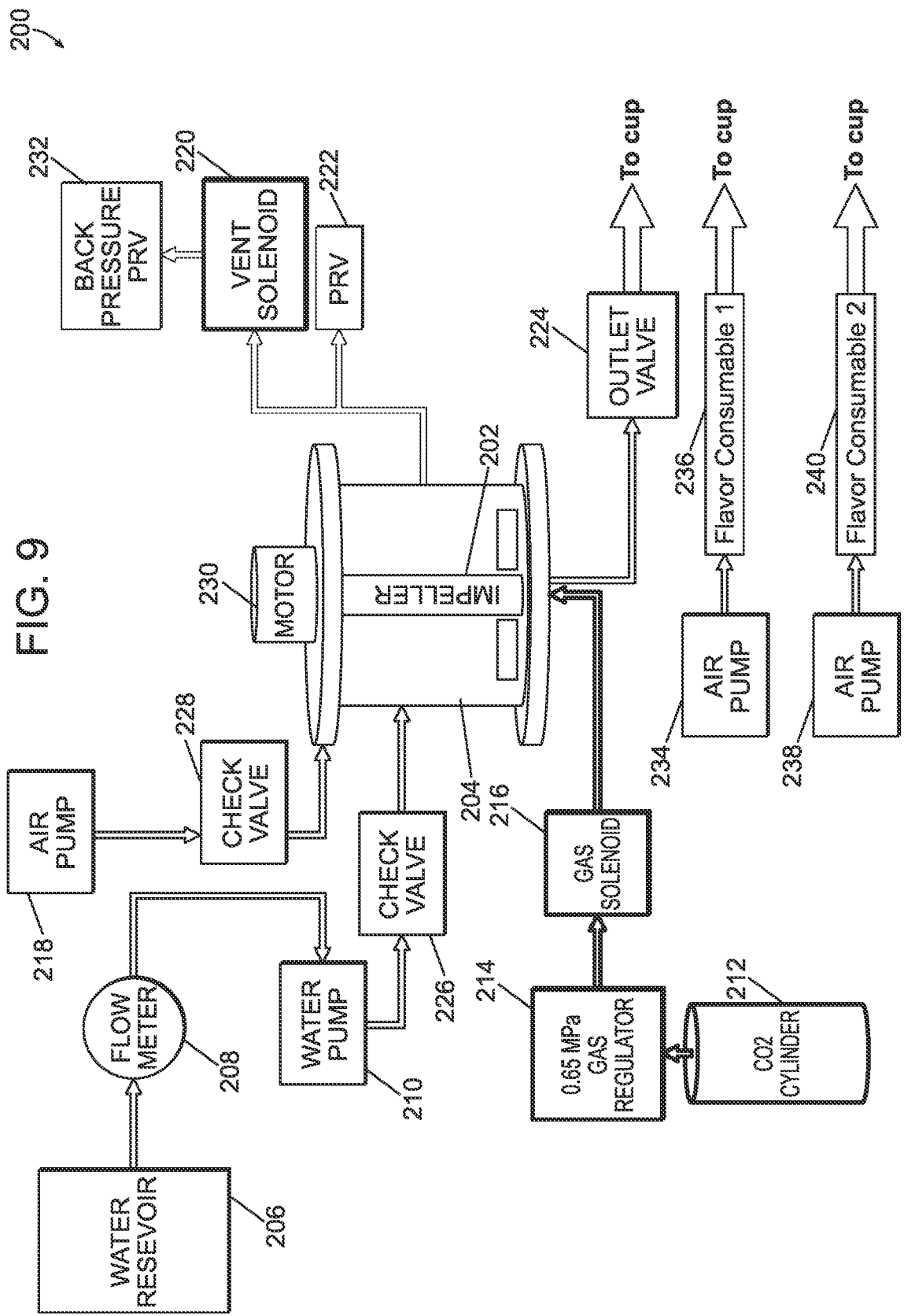
FIG. 9 is a schematic view of another embodiment of a carbonation system.

FIG. 9 illustrates another embodiment of a carbonation system 200 including an agitator (labelled "impeller" in FIG. 9) 202 disposed in a chamber 204 in which the agitator 202 is configured to rotate to form a carbonated fluid. The agitator 202 can be the agitator 10 or other agitator described herein. The carbonation system 200 of FIG. 9 is generally configured and used similar to the carbonation system 100 of FIG. 8, e.g., includes a liquid source 206, a flow meter 208, a high pressure pump 210, a gas source 212, a gas regulator 214, a gas solenoid valve 216, an outlet valve 224, a first air pump 218 configured to drive a flow of carbonated fluid out of the chamber through the outlet valve 224, a vent solenoid valve 220, and a PRV 222, and a motor 230. The liquid is water in this illustrated embodiment such that the liquid source 206 is a water reservoir, but another liquid can be used, such as juice. The gas is $CO_2$ such that the gas source 212 is a $CO_2$ cylinder in this illustrated embodiment but another gas can be used. The gas regulator 214 is an 0.65 MPa gas regulator in this illustrated embodiment but other gas regulators can be used. The container into which the carbonated fluid is dispensed via the outlet valve 224 is a cup in this illustrated embodiment, but another type of container can be used.

The carbonation system 200 also includes a first check valve 226 disposed between the high pressure pump 210 and the chamber 204. The first check valve 226 is configured to allow the liquid to flow only in a direction toward the chamber 204.

The carbonation system 200 also includes a second check valve 228 disposed between the first air pump 218 and the chamber 204. The second check valve 228 is configured to allow the air to flow only in a direction toward the chamber 204.

The carbonation system 200 also includes a back pressure PRV 232 in fluidic parallel with the vent solenoid valve 220 that is configured to independently facilitate safe escape of excess pressure from the chamber 204 in the event of an over-pressure condition.

The carbonation system 200 also includes a second air pump 234, a first flavor consumable 236, a third air pump 238, a second flavor consumable 240. The second air pump 234 is configured to cause a first flavorant contained in the first flavor consumable 236, e.g., a cup, a pouch, etc., to be dispensed into the cup (or other container). The third air pump 238 is configured to cause a second flavorant contained in the second flavor consumable 240, e.g., a cup, a pouch, etc., to be dispensed into the cup (or other container). The carbonation system 200 can be configured to allow a user to select which one or both of the first and second flavorants is dispensed into the cup (or other container) and/or to allow the user to select an amount of the selected flavorant(s) to be dispensed into the cup (or other container). The user may select no flavorant. The selected flavorant(s) can be dispensed into the cup (or other container) before the carbonated fluid is dispensed, after the carbonated fluid is dispensed, or simultaneously with the dispensing of the carbonated fluid.

The carbonation systems 100, 200 of FIGS. 8 and 9 each include an air pump 118, 218 configured to drive a flow of the carbonated fluid to dispense carbonated fluid through the outlet valve 128, 224. Using air in dispensing carbonated fluid re-enriches the chamber 104, 204 with air at every mixing cycle, which then affects the next mixing cycle. In the next mixing cycle, the chamber 104, 204 is mostly filled with air during its filling with the liquid, so the gas cannot start to dissolve in the chamber 104, 204 during the filling cycle, but only in the next stage of the process when the gas regulator 114, 214 supplies high pressure gas into the chamber 104, 204. Air pumps 118, 218 are generally low cost, but a flow rate provided by the air pump 118, 218 must be equal than or greater to a dispense flow rate, e.g., greater than or equal to 2 L/min, to effectively dispense the carbonated fluid.

In other embodiments, a carbonation system can be configured to introduce a gas from a gas source into the chamber to dispense carbonated fluid through an outlet valve. The gas source is the same gas source that supplies gas to the chamber for mixing with a liquid in the chamber. Agitation may last for a shorter amount of time using the gas for dispensing instead of air since the gas can start to dissolve in the chamber as soon as liquid starts to be introduced into the chamber and not be wasted by being able to begin dissolving into the liquid in the chamber before agitation begins with agitator rotation. Also, the effective concentration of gas in the chamber's headspace may be increased in the absence of dilution by residual air. For example, sufficient agitation may last 10 seconds when gas is used for dispensing and last 12 seconds when air is used for dispensing.

Figure 10:
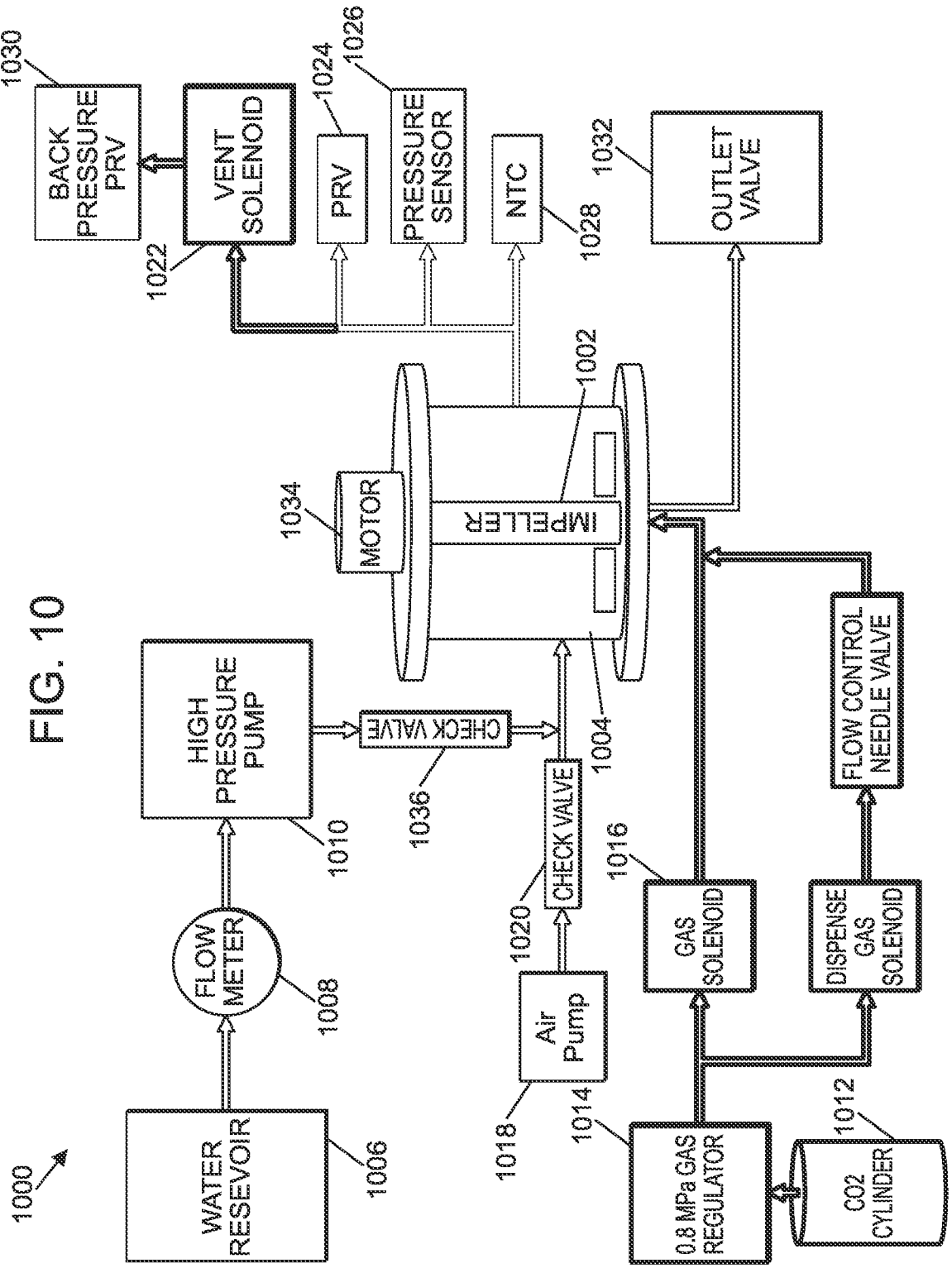
FIG. 10 is a schematic view of yet another embodiment of a carbonation system.

FIG. 10 illustrates one embodiment of a carbonation system 1000 configured to use gas in dispensing carbonated fluid. The carbonation system 1000 including an agitator (labelled "impeller" in FIG. 10) 1002 disposed in a chamber 1004 in which the agitator 1002 is configured to rotate to form a carbonated fluid. The agitator 1002 can be the agitator 10 or other agitator described herein. The carbonation system 1000 of FIG. 10 is generally configured and used similar to the carbonation systems 100, 200 of FIGS. 8 and 9 except for the dispensing using gas, e.g., includes a liquid source 1006, a flow meter 1008, a high pressure pump 1010, a gas source 1012, a gas regulator 1014, a first gas solenoid valve 1016, an air pump 1018, a first check valve 1020, a vent solenoid valve 1022, a PRV 1024, a pressure sensor 1026, a temperature sensor 1028, a back pressure PRV 1030, an outlet valve 1032, a motor 1034, and a second check valve 1036. The liquid is water in this illustrated embodiment such that the liquid source 1006 is a water reservoir, but another liquid can be used, such as juice. The gas is $CO_2$ such that the gas source 1012 is a $CO_2$ cylinder in this illustrated embodiment but another gas can be used. The gas regulator 1014 is an 0.8 MPa gas regulator in this illustrated embodiment but other gas regulators can be used.

The carbonation system 1000 also includes a second gas solenoid valve 1038 and a flow control needle valve 1040 that are configured to allow gas to flow from the gas source 1012 into the chamber 1004 to cause carbonated fluid to exit the chamber 1004 for dispensing through the outlet valve 1032.

Figure 11:
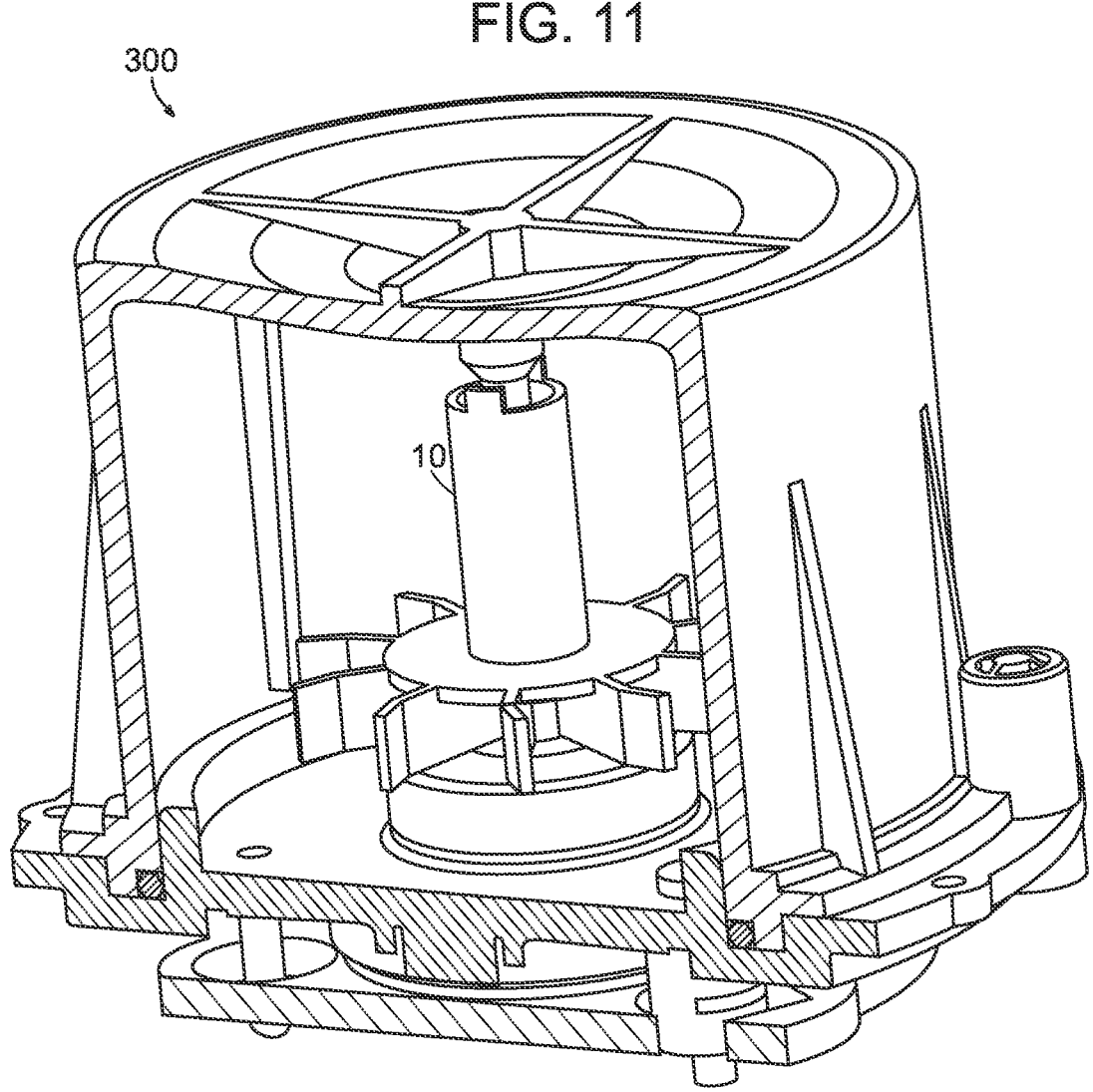
FIG. 11 is a cross-sectional perspective view of one embodiment of a chamber having the agitator of FIG. 1 disposed therein.
Figure 12:
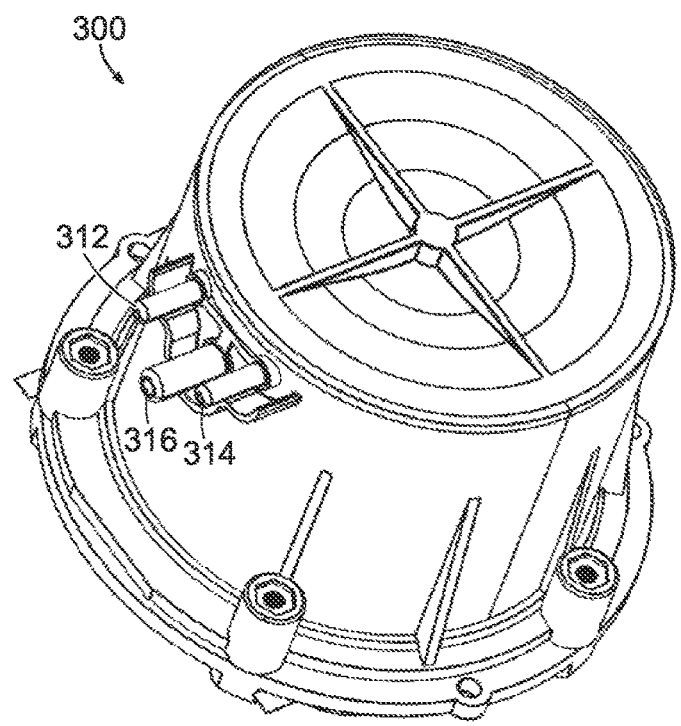
FIG. 12 is another perspective view of the chamber of FIG. 11.

FIGS. 11 and 12 illustrate one embodiment of a chamber 300 in which an agitator is configured to be disposed to mix a liquid and a gas to form a carbonated fluid. The agitator 10 of FIGS. 1-7 is shown disposed in the chamber 300 in FIGS. 11 and 13, but another agitator described herein can be disposed in the chamber 300.

Figure 14:
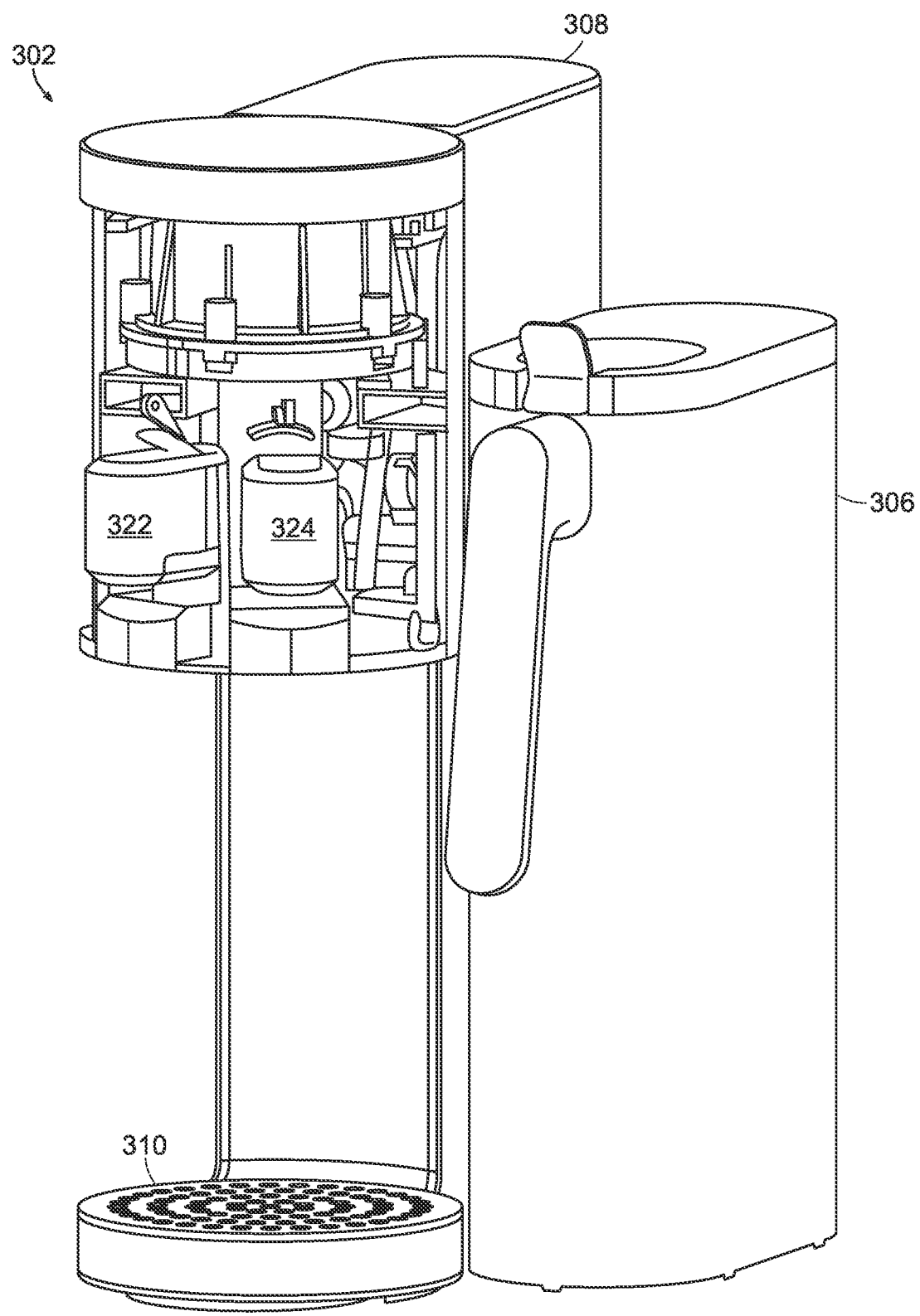
FIG. 14 is a partial perspective view of one embodiment of a carbonation system including the chamber of FIG. 11 and the agitator of FIG. 1.
Figure 15:
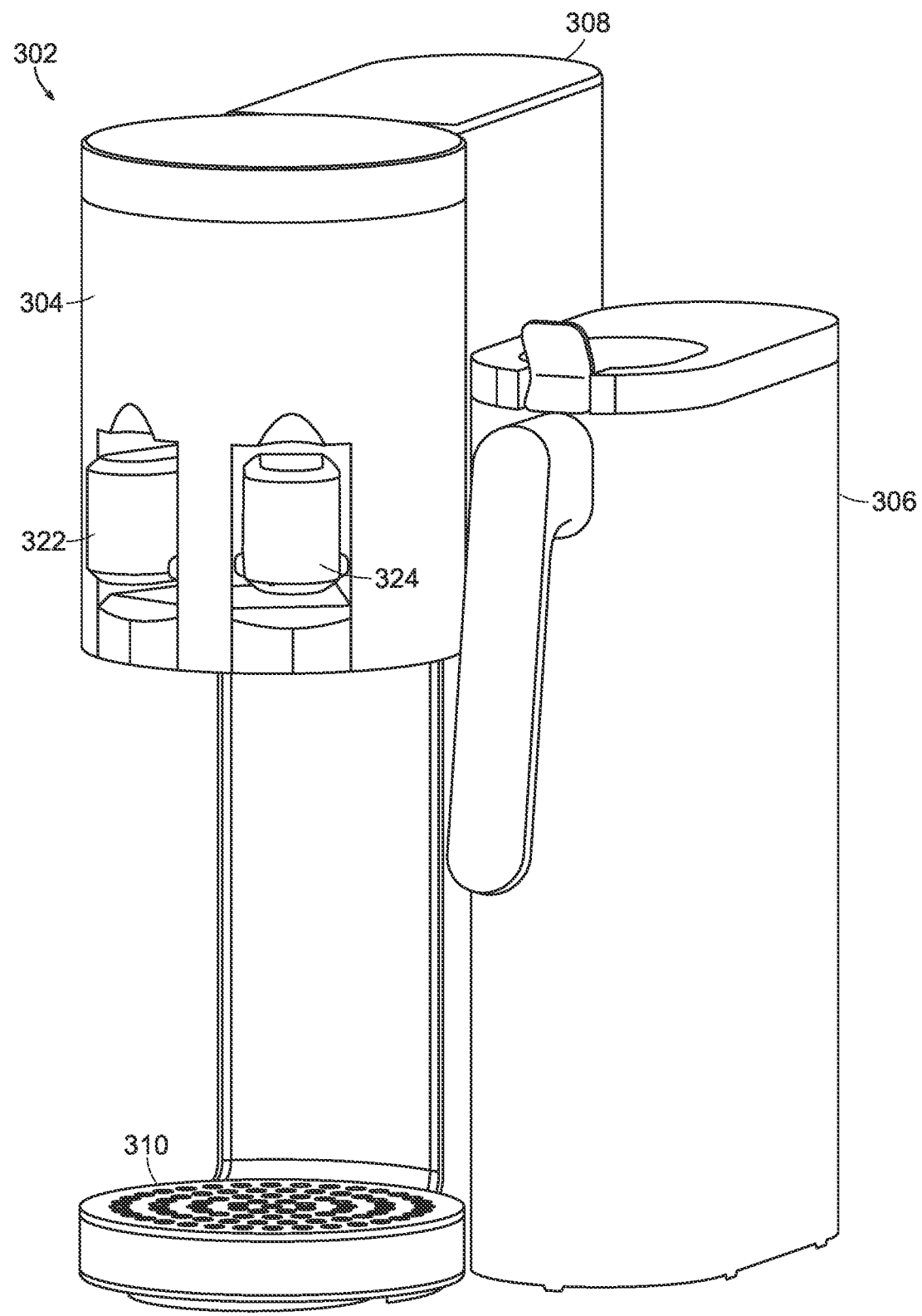
FIG. 15 is another perspective view of the carbonation system of FIG. 14.

FIG. 14 illustrates the chamber 300 as part of a carbonation system 302, which is also shown in FIG. 15. A cover 304 of the carbonation system 302 is omitted in FIG. 14 to show the chamber 300. The carbonation system 302 can have a variety of configurations, such as a configuration similar to the carbonation system 100 of FIG. 8, the carbonation system 200 of FIG. 9, or the carbonation system 1000 of FIG. 10. As shown in FIGS. 14 and 1415 the carbonation system 302 includes a liquid source 306 in the form of a pitcher configured to be releasably coupled to a housing 308 of the carbonation system 302 in which the chamber 300 is located. Other liquid sources can be used, and the pitcher 306 can have any of a variety of configurations. A check valve, such as the first check valve 226 of FIG. 9 or the second check valve 1036 of FIG. 10, can be configured to automatically open in response to the pitcher 306 being seated in a base (not shown) of the carbonation system 302 to allow liquid, e.g., water, in the pitcher 306 to flow out of the pitcher 306 and into the chamber 300. The carbonation system 302 in this illustrated embodiment is configured to selectively dispense first and second flavorants from first and second flavorant consumables 322, 324, respectively, into a container placed on a container base 310 of the carbonation system 302 that can also serve as a drip tray.

As shown in FIG. 12, the chamber 300 is configured to receive liquid therein through a liquid inlet 312 operably coupled to the liquid source 306 (e.g., through liquid tubing and/or other components) and is configured to receive gas therein through a gas inlet 314 operably coupled to a gas source (obscured in the figures) of the carbonation system 302 (e.g., through gas tubing and/or other components). Excess liquid and gas not dispensed from the chamber 300 through an outlet valve is configured to exit the chamber 300 through an outlet 316 operably coupled to a vent solenoid (obscured in the figures), such as the vent solenoid 120 of FIG. 8, the vent solenoid 220 of FIG. 9, or the vent solenoid 1022 of FIG. 10.

Figure 13:
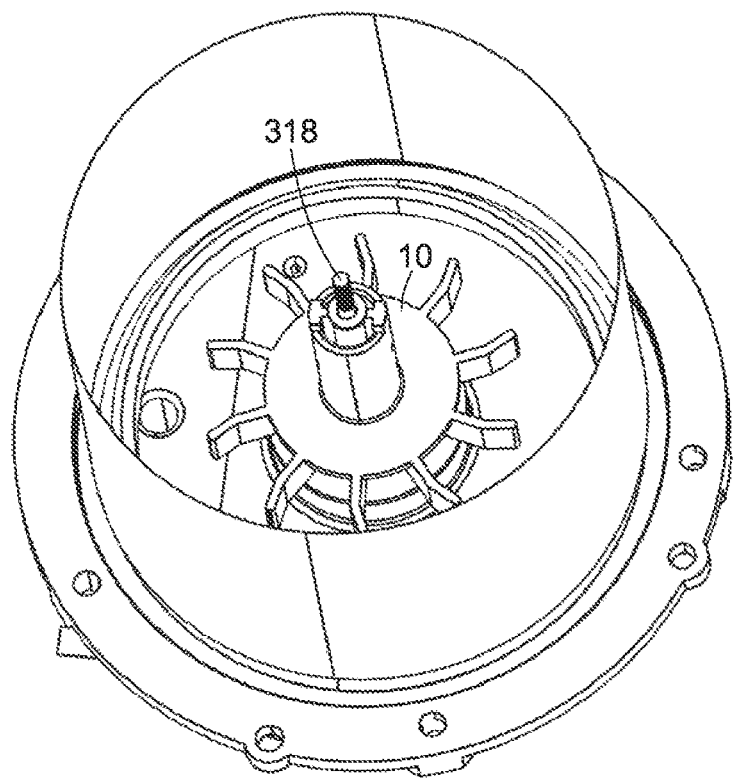
FIG. 13 is another cross-sectional perspective view of the chamber of FIG. 11 and the agitator of FIG. 1.

As shown in FIG. 13, a drive rod 318 extends through the central bore 26 of the agitator 10. The drive rod 318 is in fixed relation to the agitator 10 such that rotation of the drive rod 318 is configured to cause rotation of the agitator 10. The drive rod 318 is configured to operably couple to a motor to drive the rotation of the agitator 10 via the rotation of the drive rod 318.

Figure 16:
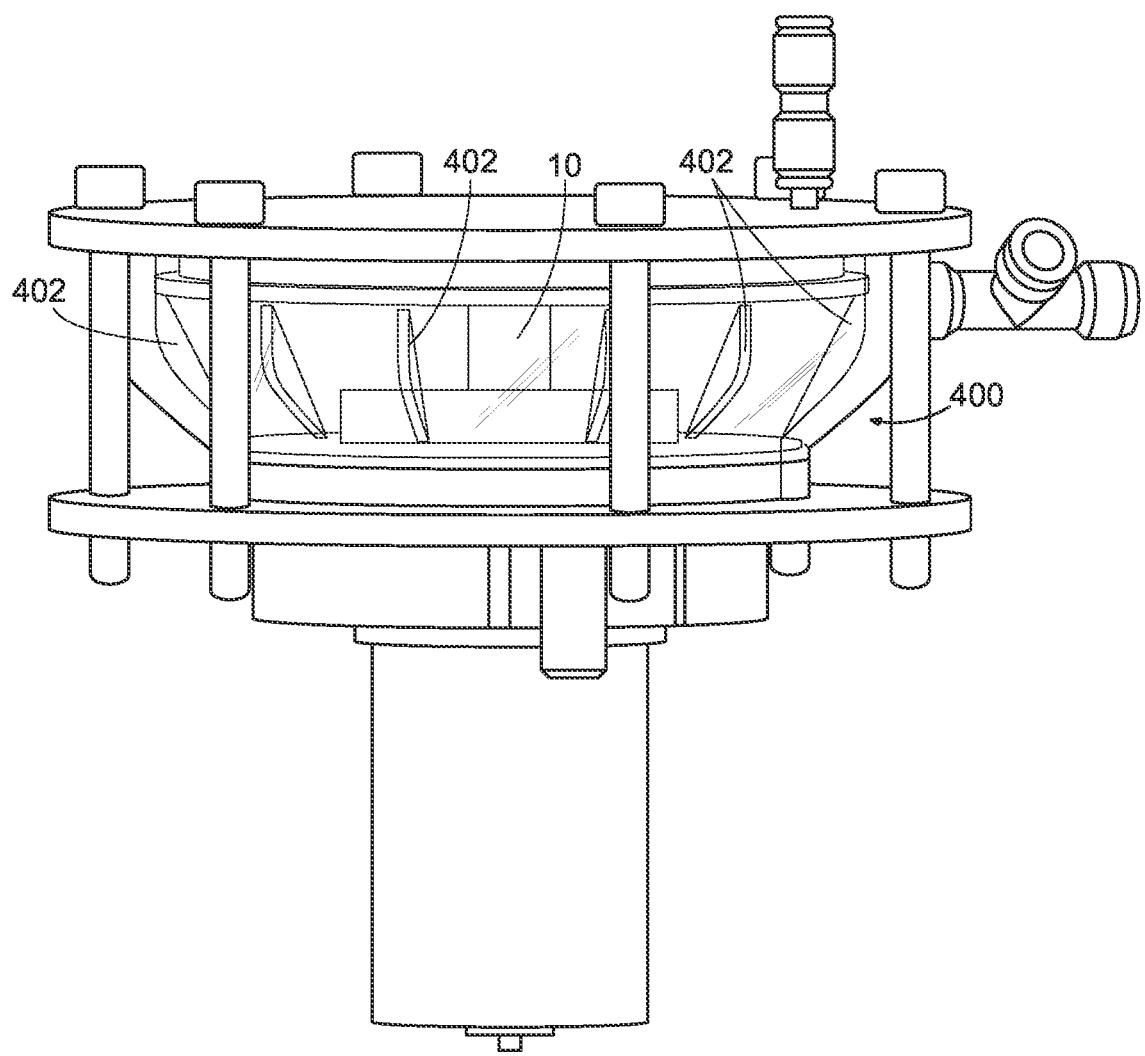
FIG. 16 is a perspective view of another embodiment of a chamber having the agitator of FIG. 1 disposed therein.

FIG. 16 illustrates another embodiment of a chamber 400 in which an agitator is configured to be disposed to mix a liquid and a gas to form a carbonated fluid. The agitator 10 of FIGS. 1-7 is shown disposed in the chamber 400 in FIG. 16, but another agitator described herein can be disposed in the chamber 400. The chamber 400 is generally configured and used similar to the chamber 300 of FIGS. 11-14. The chamber 400 in this illustrated embodiment includes a plurality of baffles (also referred to herein as "ribs") 402 therein. The baffles 402 are configured to further encourage fragmentation of gas bubbles in the chamber 400 and to suppress bulk rotation of the liquid in the chamber 400. The chamber 400 includes six baffles 402 in this illustrated embodiment but can include another plural number of baffles 402, e.g., two, three, four, etc.

The baffles 402 are configured to cooperate with the agitator 10, e.g., the arms 14 of the agitator 10, to form the carbonated fluid by mixing the liquid and the gas in the chamber 400. While the agitator 10, and thus its arms 14, is configured to move in the chamber 400 during the liquid and gas mixing process, the baffles 402 are configured to be stationary in the chamber 400 during the mixing process.

The baffles 402 each extend radially inward from an inner wall of the chamber 400. The baffles 402 thus each extend in a direction toward the agitator 10 in the chamber 400. The baffles 402 thus extend radially inward while the arms 14 extend radially outward, e.g., in a direction opposite to the baffles 402. The baffles 402 also each extend longitudinally along the inner wall of the chamber 400. The baffles 402 in this illustrated embodiment do not extend fully from a top to a bottom of the chamber 400 but could so extend in other embodiments.

Each of the baffles 402 in this illustrated embodiment have a half oval shape to conform to the curved inner wall of the chamber 400. The baffles 402 can have other shapes. For example, each rib 402 can have a triangular wedge shape in which a wider base portion of the wedge shape is toward a bottom of the chamber 400 such that the rib 402 tapers radially inward in a downward direction. For another example, the baffles 402 can each have a semi-circular shape.

A motor configured to drive rotation of an agitator, e.g., the agitator 10 of FIGS. 1-7, the agitator 102 of FIG. 8, the agitator 202 of FIG. 9, the agitator 1002 of FIG. 10, or other agitator described herein, can have a variety of configurations. In an exemplary embodiment, the motor configured to drive the agitator includes a brushless direct current (BLDC) motor.

FIG. 17 illustrates one embodiment of a BLDC motor 500 that includes a stator 502 and a rotor 504. The BLDC motor 500 in this illustrated embodiment allows for a contactless magnetic drive system. The motor 500 is configured to drive rotation of an agitator 506 that is generally configured and used similar to the agitator 10 of FIGS. 1-7, the agitator 102 of FIG. 8, the agitator 202 of FIG. 9, the agitator 1002 of FIG. 10, or other agitator described herein. The agitator 506 is disposed within a chamber 508, e.g., the chamber 104 of FIG. 8, the chamber 204 of FIG. 9, the chamber 1004 of FIG. 10, the chamber 300 of FIGS. 11-14, or other chamber as described herein, of a carbonation system, e.g., the carbonation system 100 of FIG. 8, the carbonation system 200 of FIG. 9, the carbonation system 1000 of FIG. 10, the carbonation system 300 of FIGS. 14 and 15, or other carbonation system described herein.

The rotor 504 includes a permanent magnet, and the stator 502 include metallic coils electrically coupled to a DC source (not shown). DC current provided to the stator 502 is configured to create an electromagnetic field, which is configured to cause the rotor 504 to rotate such that a drive rod (obscured in FIG. 1176) that is part of the motor 500 and operatively coupled the rotor 504 rotates and thus causes rotation of the agitator 506 operatively coupled to the drive rod. In an exemplary embodiment, the permanent magnet is plastic such that the rotor 504 is not susceptible to corrosion, unlike a metal permanent magnet that is susceptible to corrosion.

As shown in FIG. 17, the rotor 504 is disposed inside the chamber 508, and the stator 502 is disposed outside of the chamber 508. The chamber 508 includes an upper (e.g., proximal) cavity 508c configured to seat the stator 502 therein. A wall of the chamber 508 thus separates the stator 502 and the rotor 504. As mentioned above, the rotor 504 and the agitator 506 each being located in the chamber 508 may provide less risk of seal erosion because no seal is needed for a rotating shaft between the motor 500 and the chamber 508. Also with the rotor 504 and the agitator 506 each being located in the chamber 508, no lubricant is needed, thereby helping to preserve a food safe environment.

The agitator 506 includes a magnet at an upper end thereof, such as in a housing 506h of the agitator. The housing 506h of the agitator 506 is disposed adjacent the rotor 504 such that the magnet of the agitator 560 is within an effective distance of the rotor's permanent magnet. The agitator's magnet is configured to interact with the rotor 504, e.g., the permanent magnet. In response to the rotation of the rotor 504, the magnet and thus the housing 506h of the agitator 506 is configured to rotate, thereby causing the agitator 506 to rotate within the chamber 508. The motor 500 is thus "contactless" with the agitator 506.

The relative locations of the magnet of the agitator 506 and the magnet of the rotor 504 can vary. In an exemplary embodiment, the magnet is positioned in the agitator's housing 506h and relative to the magnet of the rotor 504 to ensure balanced and predominantly radial forces on the agitator 10 because such an arrangements may reduce total axial forces on the agitator 10 and the rotor 504 and total energy consumption in friction by the rotating components, e.g., the agitator 10 and the rotor 504.

FIG. 18 illustrates another embodiment of a BLDC motor 600 that includes a stator 602 and a rotor 604. The motor 600 is configured to drive rotation of an agitator 606 that is generally configured and used similar to the agitator 10 of FIGS. 1-7, the agitator 102 of FIG. 8, the agitator 202 of FIG. 9, the agitator 1002 of FIG. 10, or other agitator described herein. The agitator 606 is disposed within a chamber 608, e.g., the chamber 104 of FIG. 8, the chamber 204 of FIG. 9, the chamber 1004 of FIG. 10, the chamber 300 of FIGS. 11-14, or other chamber as described herein, of a carbonation system, e.g., the carbonation system 100 of FIG. 8, the carbonation system 200 of FIG. 9, the carbonation system 1000 of FIG. 10, the carbonation system 300 of FIGS. 14 and 15, or other carbonation system described herein. The rotor 604 and the stator 602 are disposed outside of the chamber 608. Such a motor 600 location may be desirable, for example, in modifying existing carbonation system designs, as mentioned above. A drive rod 610 operatively coupled to the rotor 604 extends from outside the chamber 608 to inside the chamber 608 through an opening 612 formed in the chamber 608. A seal 614, e.g., a seal of rubber, silicone, etc., is provided in the opening 612 around the drive rod 610. Over time, the seal 614 can erode due to the rotating drive rod 610 rubbing against the seal 614, the high pressure in the chamber 608, and/or the seal's exposure to the gas and/or liquid in the chamber 608.

Figure 19:
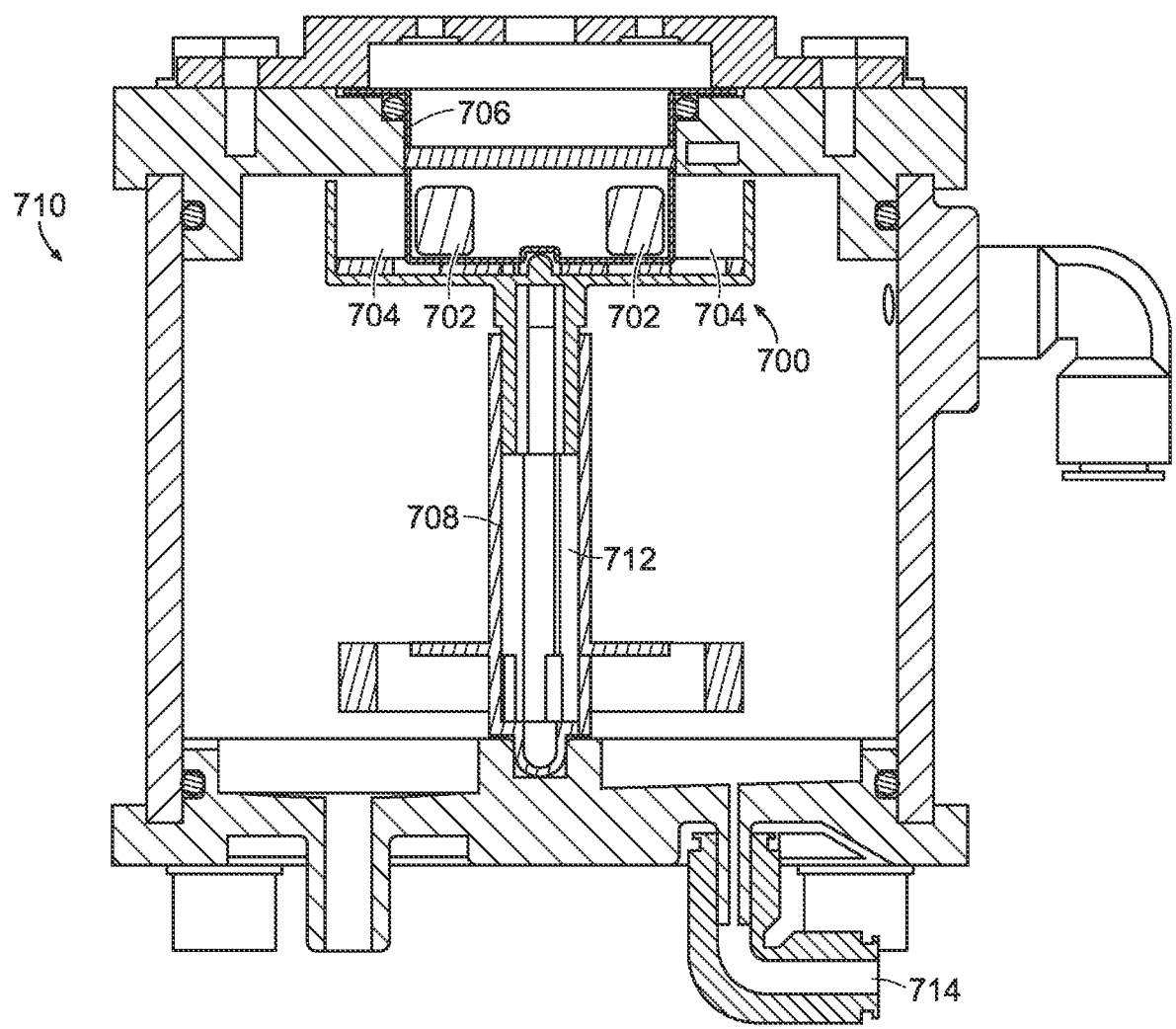
FIG. 19 is a cross-sectional schematic view of another embodiment of a chamber having the agitator of FIG. 1 disposed therein and operatively coupled to another embodiment of a motor.

FIG. 19 illustrates another embodiment of a BLDC motor 700 that includes a stator 702 and a rotor 704. The BLDC motor 700 in this illustrated embodiment allows for a contactless magnetic drive system. The motor 700 of FIG. 19 is generally configured and used similar to the motor 500 of FIG. 16. The motor 700 is shown operably coupled to an agitator 708 disposed in a chamber 710. The stator 702 is disposed outside of the chamber 710, and the rotor 704 is disposed inside the chamber 710. A bushing 706 of the motor 700 separates the stator 702 and the rotor 704 in this illustrated embodiment. A drive rod 712 of the agitator 708 is operatively coupled to an upper housing 708h of the agitator 708 that houses a magnet that is in effective distance of the rotor 704. The upper housing 708h is configured to rotate in response to rotation of the rotor 704 and thus cause rotation of the drive rod 712 and a remainder of the agitator 708. In an exemplary embodiment, the permanent magnet of the rotor 704 is plastic such that the rotor 704 is not susceptible to corrosion, unlike a metal permanent magnet that is susceptible to corrosion.

FIG. 19 also illustrates one embodiment of an outlet valve 714 through which carbonated fluid is configured to exit the chamber 710.

Figure 20:
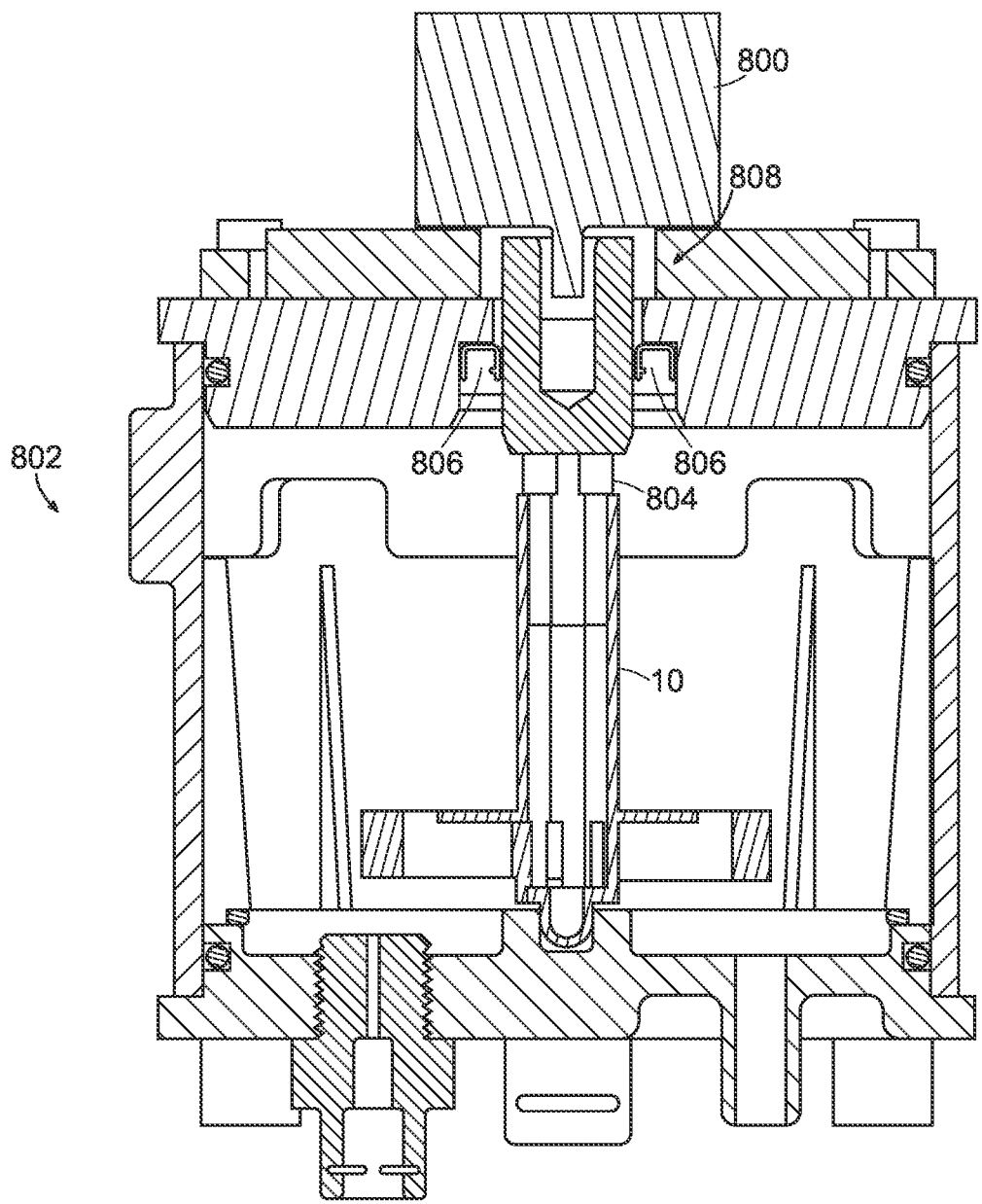
FIG. 20 is a cross-sectional schematic view of yet another embodiment of a chamber having the agitator of FIG. 1 disposed therein and operatively coupled to another embodiment of a motor.

FIG. 20 illustrates another embodiment of a BLDC motor 800 that includes a stator (obscured in FIG. 20) and a rotor (obscured in FIG. 20). The motor 800 of FIG. 20 is generally configured and used similar to the motor 600 of FIG. 18. The motor 800 is shown operably coupled to the agitator 10 of FIGS. 1-7. The stator and the rotor are each disposed outside of a chamber 802 in which the agitator 10 of FIGS. 1-7 is disposed. A drive rod 804 is operatively coupled the rotor and is configured to rotate in response to a rotational driving force from the rotor and thus cause rotation of the agitator 10 operatively coupled to the drive rod 804. A seal 806, e.g., a seal of rubber, silicone, etc., is provided in an opening 808 formed in the chamber 802 around the drive rod 804.

Another embodiment of a BLDC motor configured to drive rotation of an agitator, e.g., the agitator 10 of FIGS. 1-7, the agitator 102 of FIG. 8, the agitator 202 of FIG. 9, the agitator 1002 of FIG. 10, or other agitator described herein, disposed within a chamber, e.g., the chamber 104 of FIG. 8, the chamber 204 of FIG. 9, the chamber 1004 of FIG. 10, the chamber 300 of FIGS. 11-14, or other chamber as described herein, allows for a standard magnetic drive system. The motor includes a drive rod includes a plurality of protrusions extending radially outward therefrom. A number of the protrusions equals a number of paddles of the agitator. The agitator includes a housing at an upper end thereof that includes a magnet therein. The housing of the agitator surrounds a housing of the motor. The magnet in the agitator's housing is configured to interact with a rotor of the motor, which also includes a stator. In response to the rotation of the rotor, the magnet of the agitator is configured to rotate, thereby causing the agitator to rotate within a chamber in which the agitator is disposed.

Figure 21:
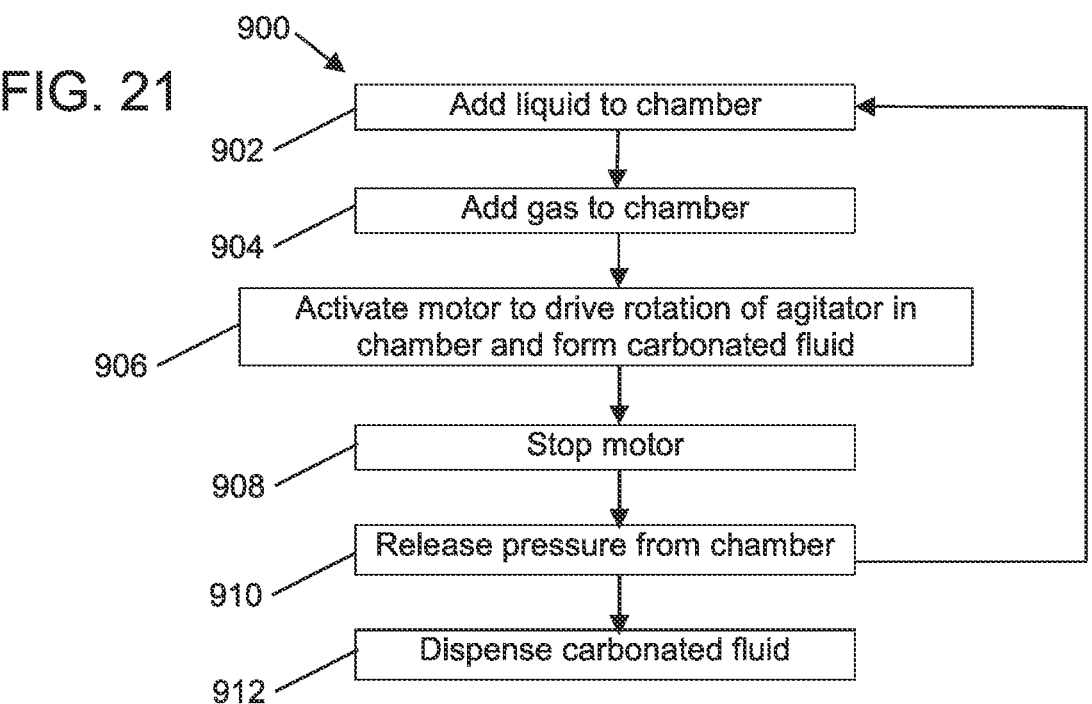
FIG. 21 is a flowchart of one embodiment of a method of mixing a liquid and a gas to form a carbonated fluid in a chamber using an agitator.
Figure 22:
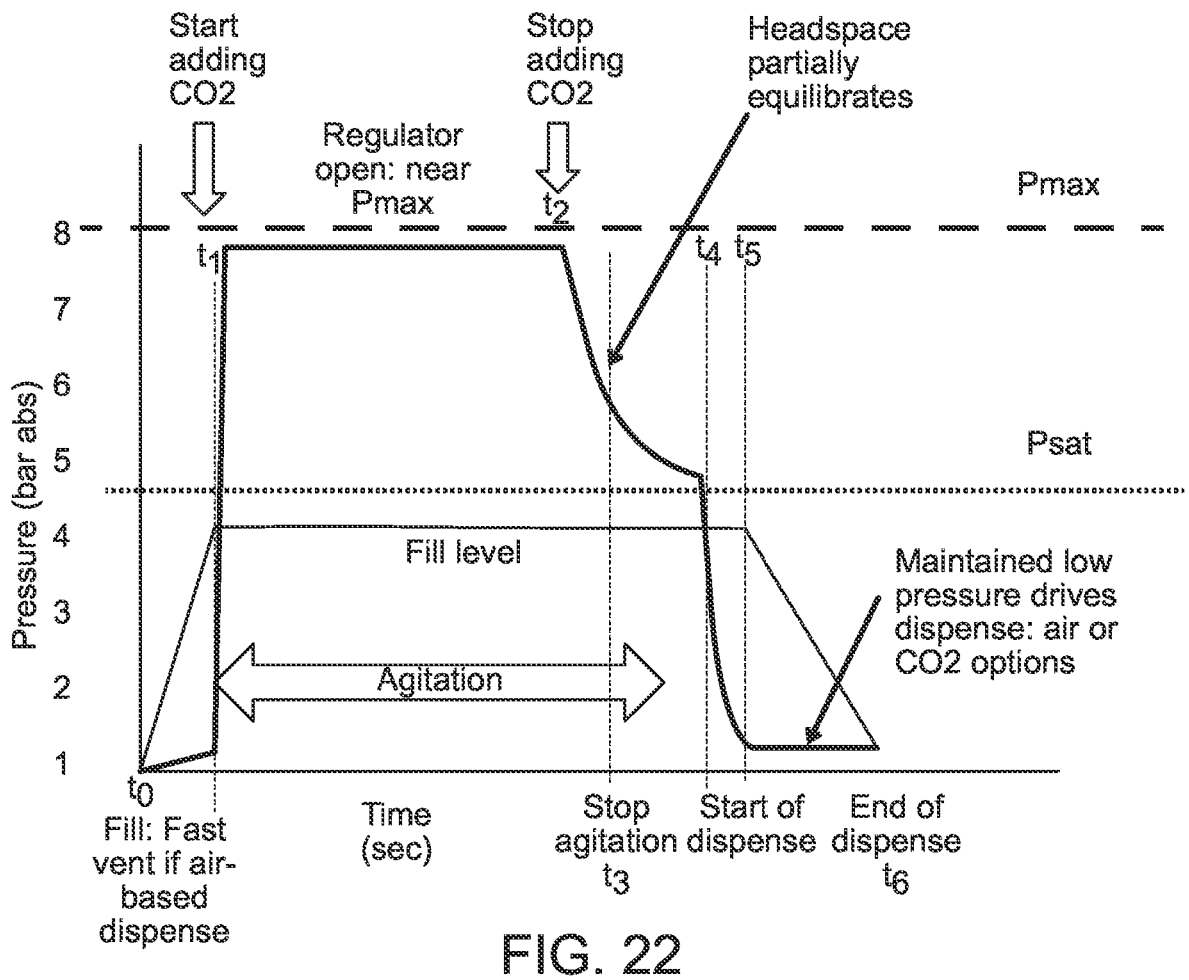
FIG. 22 is one embodiment of a graph showing pressure versus time for the method of FIG. 21.
Figure 23:
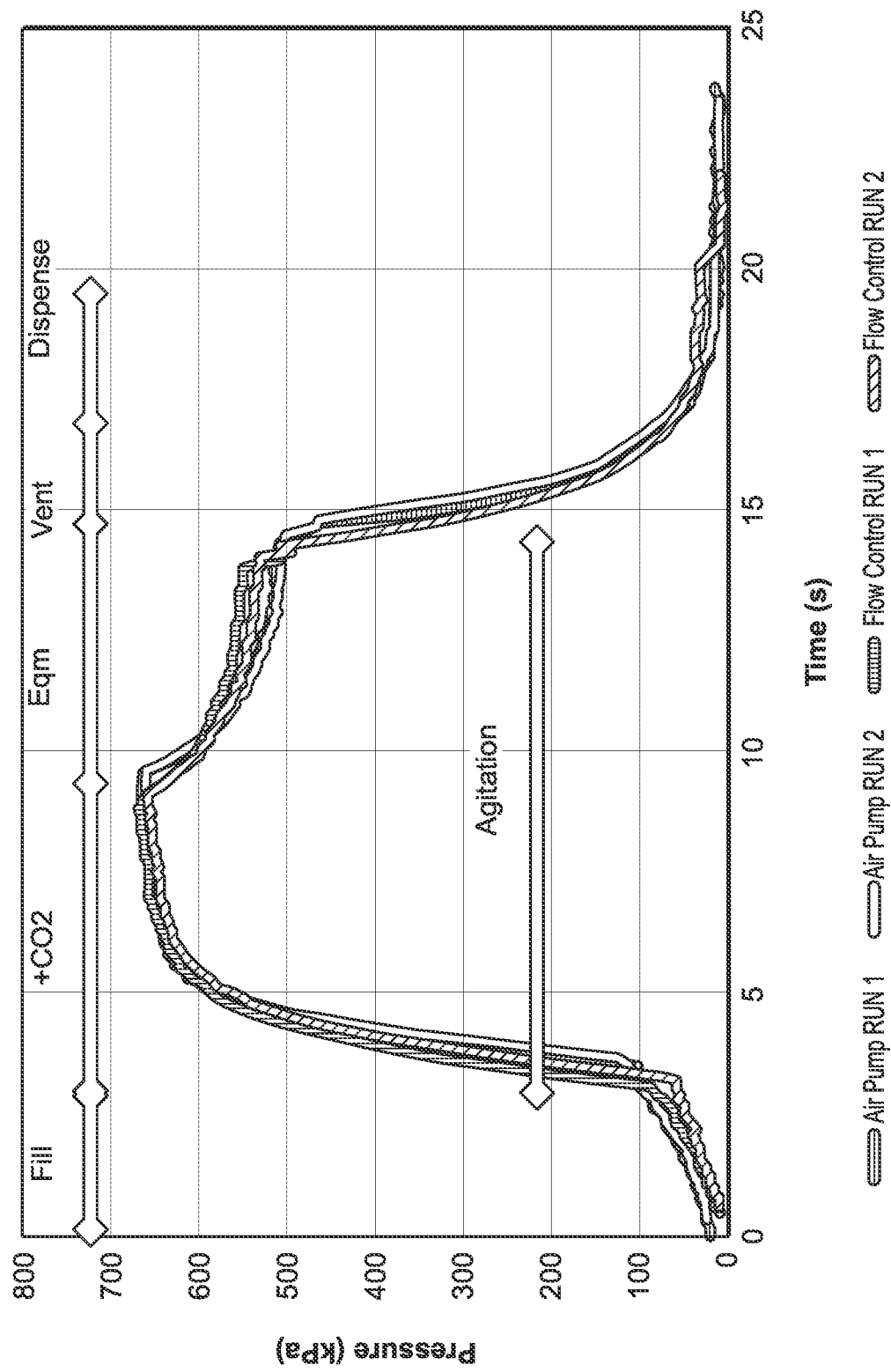
FIG. 23 is another embodiment of a graph showing pressure versus time for the method of FIG. 21.

FIG. 21 illustrates one embodiment of a method 900 of mixing a liquid (e.g., water, juice, etc.) and a gas ($CO_2$, etc.) to form a carbonated fluid in a chamber (e.g., the chamber 104 of FIG. 8, the chamber 204 of FIG. 9, the chamber 1004 of FIG. 10, the chamber 300 of FIGS. 11-14, the chamber 400 of FIG. 15, the chamber 508 of FIG. 17, the chamber 608 of FIG. 18, the chamber 710 of FIG. 19, the chamber 802 of FIG. 20, or other chamber described herein) using an agitator (e.g., the agitator 10 of FIGS. 1-7, the agitator 102 of FIG. 8, the agitator 202 of FIG. 9, the agitator 506 of FIG. 17, the agitator 606 of FIG. 18, the agitator 708 of FIG. 19, or other agitator described herein). In an exemplary embodiment, the chamber and the agitator are part of a carbonation system (e.g., the carbonation system 100 of FIG. 8, the carbonation system 200 of FIG. 9, the carbonation system 1000 of FIG. 10, the carbonation system 302 of FIGS. 14 and 15, or other carbonation system described herein). The method 900 is discussed below with respect to FIGS. 22 and 23, which illustrates graphs showing example operation of the method 900 with the gas being $CO_2$. The graph of FIG. 22 plots pressure (bar abs) versus time (sec) for one mixing cycle. The graph of FIG. 23 plots pressure (kPa) versus time for one mixing cycle in two example runs.

The method 900 includes adding 902 the liquid to the chamber from a liquid source starting at time zero $t_0$ and adding 904 the gas to the chamber from a gas source starting at a first time $t_1$. FIG. 22 shows between time zero $t_0$ and the first time $t_1$ that there is about 1 bar of pressure in the chamber, e.g., in a headspace thereof, before the gas begins being added 904 at the first time $t_1$. This excess pressure in the chamber before the first time $t_1$ may reduce a maximum amount of achievable gas concentration. The liquid begins being added 902 to the chamber before the gas begins being added 904 to the chamber in this illustrated embodiment and stops being added 902 to the chamber before the gas begins being added 904 to the chamber. In other embodiments, the gas can begin being added 904 to the chamber before the liquid begins being added 902 to the chamber. In other embodiments, the gas and liquid can be added 902, 904 to the chamber at overlapping times, either fully overlapping or partially overlapping.

With the liquid and the gas in the chamber, a motor (e.g., the motor 130 of FIG. 8, the motor 230 of FIG. 9, the motor 1034 of FIG. 10, the motor 500 of FIG. 17, the motor 600 of FIG. 1718 the motor 700 of FIG. 19, the motor 800 of FIG. 1920 or other motor described herein) is activated 906 at the first time $t_1$ to drive rotation of the agitator in the chamber and form a carbonated fluid. The motor can instead be activated 906 after the gas has started being added 904 to the chamber. The rotation of the agitator causes the gas and the liquid in the chamber to mix, as described herein, such that the gas dissolves in the liquid. The motor can be activated 906 in any number of ways. For example, the motor can be activated 906 automatically (e.g., by a microcontroller or other processor of the motor or carbonation system that includes the motor) in response to an end of each of the liquid and the gas being added 902, 904 to the chamber to ensure that all of the gas and the liquid intended to be in the chamber is in the chamber being mixing with the agitator begins.

The gas stops being added 904 to the chamber at a second time $t_2$ during the agitation. Stopping the addition 904 of the gas to the chamber allows a headspace in the chamber (e.g., a space above the liquid fill level in the chamber) to partially equilibrate in pressure. The motor is then stopped 908 at a third time $t_3$ to stop causing the agitator's rotation. FIG. 22 shows that agitation continues for an amount of time past the third time $t_3$ while the agitator and mass of agitated liquid slows to fully stop rotating and settle before dispensing. Allowing the mixed fluid to settle permits gas bubbles to separate from the liquid before the chamber's headspace pressure is released. The motor can be configured to stop 908 in any of a variety of ways. For example, the motor can be configured to drive the agitator's rotation for a predetermined amount of time. For another example, the motor can be configured to drive the agitator's rotation until a threshold condition is met for at least one measured parameter, such as temperature in the chamber or pressure in the chamber.

The headspace continues to partially equilibrate in pressure after the motor has been stopped 908 and the agitator has fully stopped rotating and before pressure begins being released 910 from the chamber, e.g., through a vent solenoid, at a fourth time $t_4$. The pause between the complete stopping of the agitator's rotation of the start of pressure release 910 can allow the carbonated fluid in the chamber to be calm with bubbles having risen to the headspace in the chamber. Thereafter at a fifth time $t_5$ the carbonated fluid is dispensed 912 from the chamber to a container (e.g., a cup, a bottle, etc.) through an outlet valve in fluid communication with the chamber. The fill level in the chamber thus starts decreasing at the fifth time $t_5$. Starting to release 910 pressure from the chamber prior to starting to dispense 912 the carbonated fluid helps prevent the carbonated fluid from exiting the chamber at a very high rate that would prevent the carbonated fluid from being neatly dispensed into the container. The dispensing 912 stops at a sixth time $t_6$.

The method 900 can repeat any number of times to form carbonated fluids.

EXAMPLES

Mixing of a gas and a liquid can be evaluated by considering $k_L a$ (volumetric oxygen transfer coefficient, or dissolution constant), which indicates a volumetric transfer rate. The coefficient "$k_L$" is a mass transfer coefficient and the coefficient "a" is an amount of surface area per unit volume. In general, a higher $k_L a$ indicates more efficient mixing, e.g., more of the gas has been mixed into the liquid.

Mixing of a gas and a liquid can also be evaluated by considering a power of a motor driving an agitator. In general, a lower amount of motor power allows for use of a smaller motor. A smaller motor can allow for a smaller overall carbonation system and/or can free space for other components in the carbonation system that includes the motor.

Thus, achieving a high $k_L a$ while minimizing motor power generally provides efficient mixing of a gas and a liquid to form a carbonated fluid while allowing for use of a smaller motor.

Table 1 shows three tests 1, 2, 3 of various motor settings of voltage, current, speed, power, and torque and the corresponding $k_L a$. The tests 1, 2, 3 were performed using an agitator similar to the agitator 10 of FIGS. 1-7 and using a BLDC motor allowing for contactless magnetic drive system similar to the motors 500, 700 of FIGS. 17 and 19.

TABLE 1

| Test | Motor Voltage (V) | Motor Current (A) | Motor Speed (RPM) | $k_L a$ | Motor Power (kW) | Motor Torque (N * mm) |
| --- | --- | --- | --- | --- | --- | --- |
| 1 | 8.6 | 0.54 | 1080 | 0.136 | 0.004644 | 0.041 |
| 2 | 9.6 | 0.65 | 1275 | 0.124 | 0.00624 | 0.047 |
| 3 | 8.8 | 0.55 | 1166 | 0.129 | 0.00484 | 0.040 |

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A system, comprising:
   a chamber configured to receive liquid from a liquid source and gas from a gas source; and
   an agitator disposed within the chamber and having an elongate shaft and having a plurality of arms extending radially outward from the elongate shaft, each of the plurality of arms having an angled outer tip;
   wherein, when the chamber contains the liquid and the gas and the agitator is partially disposed within the liquid, the agitator is configured to be rotated by a motor to mix the gas and the liquid;
   the elongate shaft has at least one inner lumen extending therethrough between an upper opening and a lower opening; and
   the elongate shaft has a central bore extending therethrough, the at least one inner lumen being positioned radially outward of the central bore.

2. The system of claim 1, wherein each of the plurality of arms extends from the elongate shaft substantially perpendicular to a longitudinal axis of the elongate shaft.

3. The system of claim 2, wherein the outer tip of each of the plurality of arms is at an acute angle relative to the longitudinal axis of the elongate shaft.

4. The system of claim 1, wherein each of the plurality of arms has a paddle shape.

5. The system of claim 1, wherein the arms are positioned adjacent to the lower opening; and
   when the chamber is sealed, the chamber contains the liquid, and the gas and the agitator is partially disposed within the liquid and is rotated by the motor to mix the gas and the liquid, the gas above the liquid is configured to flow into the upper opening of the elongate shaft, through the at least one inner lumen of the elongate shaft, and out the lower opening such that the gas exiting the lower opening reencounters the liquid.

6. The system of claim 1, wherein an outer edge of each of the arms is defined by a plurality of fingers that extend radially outward and are configured to allow the gas to pass between adjacent ones of the fingers during the rotation of the agitator.

7. The system of claim 1, wherein an outer edge of each of the arms is a continuous substantially planar edge.

8. The system of claim 1, further comprising the motor, the motor being coupled to the agitator and configured to rotatably drive the agitator;

wherein the motor includes a stator and a rotor.

9. The system of claim 8, wherein the rotor includes a plastic magnet.

10. The system of claim 8, wherein the agitator is magnetically coupled to the motor.

11. The system of claim 8, wherein the agitator is physically coupled to a first portion of the motor; and the first portion of the motor is magnetically coupled to a second portion of the motor.

12. The system of claim 8, wherein the agitator and the rotor are disposed inside the chamber, and the stator is disposed external to the chamber.

13. The system of claim 12, wherein the rotor includes a first magnet, the agitator includes a second magnet, and rotation of the rotor is configured to drive the rotation of the agitator through interaction of the second magnet with the first magnet.

14. The system of claim 13, wherein the agitator includes an upper housing that houses the second magnet and is located adjacent to the rotor.

15. The system of claim 12, wherein a wall of the chamber separates the rotor and the stator.

16. The system of claim 12, further comprising a bushing that separates the rotor and the stator.

17. The system of claim 8, wherein the agitator is disposed inside the chamber, and the stator and the rotor are disposed external to the chamber.

18. The system of claim 3, wherein each of the arms includes a first portion proximate the elongate shaft and a second portion that is radially outward from the first portion and from the elongate shaft, the first portion extending at a first angle relative to the longitudinal axis of the elongate shaft, and the second portion extending at a second, different angle relative to the longitudinal axis such that the outer tip of each of the arms is angled.

19. The system of claim 1, further comprising a flange extending radially outward from the elongate shaft, each of the arms being located at least partially below the flange, and the lower opening being located below the flange.

20. The system of claim 1, wherein the upper opening defines an open proximal end of the elongate shaft, and the lower opening defines an open distal end of the elongate shaft; and the arms are located proximal to the lower opening and distal to the upper opening.

21. The system of claim 1, wherein the at least one inner lumen comprises first and second inner lumens.

22. The system of claim 8, further comprising a drive rod seated in the central bore;

wherein the drive rod is configured to operably couple the agitator to the motor; and the agitator is configured to rotate about a longitudinal axis of the drive rod.

* * * * *